US012700246B2

(12) United States Patent　　　　(10) Patent No.:　US 12,700,246 B2
Mason et al.　　　　　　　　　　　　(45) Date of Patent:　　Aug. 4, 2026

(54) NATURAL LANGUAGE 3D DATA SEARCHING

(71) Applicant: Samsung Electronics Co., Ltd., Suwon-si (KR)

(72) Inventors: Dane Marshal Mason, San Francisco, CA (US); Nigel Allan Carson Clarke, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 291 days.

(21) Appl. No.: 18/531,463

(22) Filed: Dec. 6, 2023

(65)　　　　　　Prior Publication Data

US 2025/0191387 A1　　Jun. 12, 2025

(51) Int. Cl.
　　*G06V 10/26*　　　　(2022.01)
　　*G06V 20/64*　　　　(2022.01)

(52) U.S. Cl.
　　CPC ............ *G06V 20/653* (2022.01); *G06V 10/26* (2022.01)

(58) Field of Classification Search
　　CPC ....... G06V 20/653; G06V 10/26; G06V 20/64
　　See application file for complete search history.

(56)　　　　　　References Cited

U.S. PATENT DOCUMENTS

| | | |
|---|---|---|
| 11,527,085 B1 | 12/2022 | Widjaja et al. |
| 2017/0193672 A1 | 7/2017 | Bhardwaj et al. |
| 2021/0232802 A1 | 7/2021 | Meany et al. |
| 2022/0075806 A1 | 3/2022 | El-Saban et al. |
| 2022/0360823 A1 | 11/2022 | Oh et al. |
| 2023/0161808 A1 | 5/2023 | Bursztyn et al. |
| 2023/0162371 A1* | 5/2023 | Shibata ..................... G06T 7/74 |
| | | 382/180 |
| 2023/0178076 A1 | 6/2023 | Abramson et al. |
| 2023/0206525 A1 | 6/2023 | Harikumar et al. |
| 2023/0206647 A1* | 6/2023 | Huang ................... G05D 1/027 |
| | | 701/26 |
| 2023/0230312 A1* | 7/2023 | Chen ...................... H04N 23/10 |
| 2023/0267720 A1* | 8/2023 | Marvasti ............... G01S 7/4802 |
| | | 382/155 |
| 2024/0137563 A1* | 4/2024 | Kadam ................... G06T 9/004 |
| 2024/0346629 A1* | 10/2024 | Harikumar ................ G06T 5/73 |

(Continued)

FOREIGN PATENT DOCUMENTS

| | | |
|---|---|---|
| EP | 4120192 A1 | 1/2023 |
| KR | 10-2556765 B1 | 7/2023 |
| KR | 10-2556767 B1 | 7/2023 |

OTHER PUBLICATIONS

Pan et al. "PSGformer: Enhancing 3D Point Cloud Instance Segmentation" dated Jul. 15, 2023 (Year: 2023).*

(Continued)

*Primary Examiner* — Ming Y Hon

(57)　　　　　　ABSTRACT

A method includes incorporating information from multimodal embeddings in an indexed point-cloud data structure with three-dimensional (3D) spatial information for a captured scene. The method also includes performing at least one of querying or retrieving 3D-point-cloud data based on a user input including at least one of natural language or image references. The method also includes enabling global scene understanding and local scene understanding using instance segmentation in conjunction with the multi-modal embeddings.

20 Claims, 25 Drawing Sheets

(56)     References Cited

U.S. PATENT DOCUMENTS

| | | | | |
|---|---|---|---|---|
| 2024/0400079 A1* | 12/2024 | Priyadarshi | ............... | G06T 7/97 |
| 2024/0419949 A1* | 12/2024 | Aykut | .................... | G06N 3/047 |
| 2025/0086225 A1* | 3/2025 | Bagwell | ................. | G06V 20/70 |

OTHER PUBLICATIONS

International Search Report and Written Opinion of the International Searching Authority dated Mar. 17, 2025, in connection with International Application No. PCT/KR2024/019928, 7 pages.

* cited by examiner

200

202　　　　　203　　　　201

300

300

400

400

500

500

600

600

700

● Image Embedding

● Text Embedding

● Two dogs in the snow

● London at night

● A cat on a table

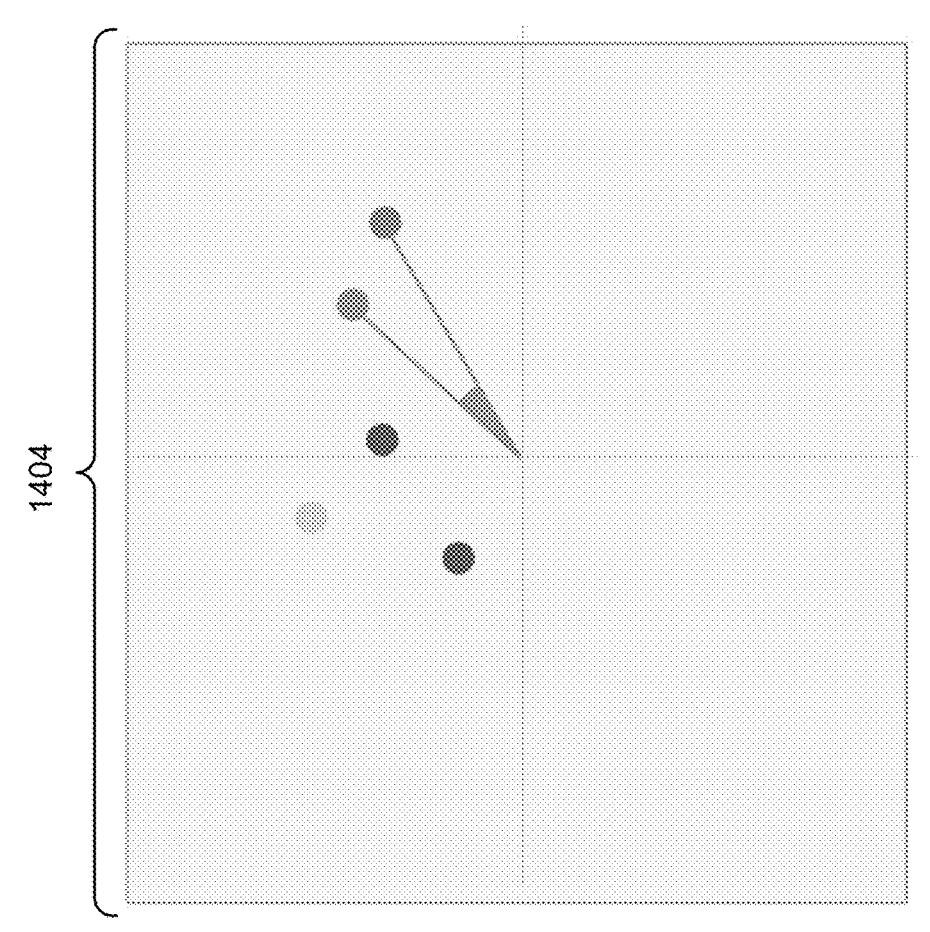
FIG. 14
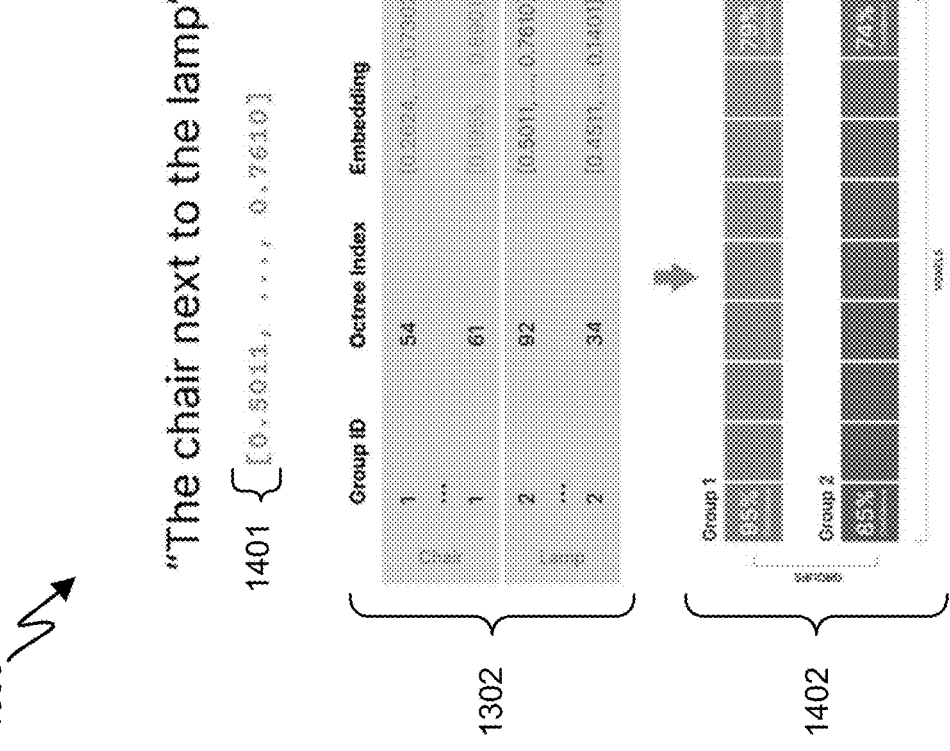

1601

1602

2000

"Chair"          "Lamp"

| Group ID | Octree Index | Embedding | Label |
|---|---|---|---|
| 1 | 54 | [0.2624, ..., 0.7302] | Chair |
| ... | | | |
| 1 | 61 | [0.1055, ..., 0.8901] | Chair |
| 2 | 92 | [0.5011, ..., 0.7810] | Lamp |
| ... | | | |
| 2 | 34 | [0.4511, ..., 0.1401] | Lamp |

```
{
  "objects": [
    {"name": "chair", "position": [0,0,0],
     "bounds": [10, 10, -5, -5], "orientation": [1,2,3,4]},
    {"name": "lamp", "position": [10,30,40],
     "bounds": [5, 5, -1, -1], "orientation": [2,3,1,4]}
  ]
}
```

NATURAL LANGUAGE 3D DATA SEARCHING

TECHNICAL FIELD

This disclosure relates generally to machine learning systems. More specifically, this disclosure relates to a system and method for natural language three-dimensional (3D) data searching.

BACKGROUND

Owing to an influx of investment in the field of robotics and autonomous vehicles, three dimensional (3D) capture technology has seen huge improvements over the last decade with cost, size, complexity, and noise of sensing technology dramatically decreasing. This has opened new frontiers and use cases in consumer electronics that were previously impossible. The 3D data created by these technologies present new challenges in privacy, user experience, and processing that are largely unaddressed. 3D scanning is the process of capturing physical objects or environments to create a digital representation in the form of a 3D model. There are many techniques for 3D scanning, including contact scanning techniques such as the pantograph, and optical scanning techniques such as lidar, photogrammetry, and structured light.

Typically, 3D scans produce point clouds, which are discrete sets of 3D points and potentially appearance attributes such as color and intensity. Point clouds are a convenient representation for many applications, as being easily visualized and manipulated. However, point clouds also have some inherent limitations. For instance, point clouds are discrete, meaning that there is a finite number of points representing a scanned object or environment. This can lead to an incomplete representation, as small features or details may not be captured. Point clouds are typically large and not easily compressible. Point clouds are also unordered, meaning that there is no inherent ordering to the points that reflects position in the scanned object or environment.

SUMMARY

This disclosure relates to system and method for natural language three-dimensional (3D) data searching.

In a first embodiment, a method includes incorporating information from multi-modal embeddings in an indexed point-cloud data structure with 3D spatial information for a captured scene. The method also includes performing at least one of querying or retrieving 3D-point-cloud data based on a user input including at least one of natural language or image references. The method further includes enabling global scene understanding and local scene understanding using instance segmentation in conjunction with the multi-modal embeddings.

In a second embodiment, an apparatus includes at least one processing device configured to incorporate information from multi-modal embeddings in an indexed point-cloud data structure with 3D spatial information for a captured scene. The at least one processing device is also configured to perform at least one of querying or retrieving 3D-point-cloud data based on a user input including at least one of natural language or image references. The at least one processing device is further configured to enable global scene understanding and local scene understanding using instance segmentation in conjunction with the multi-modal embeddings.

In a third embodiment, a non-transitory computer readable medium contains instructions that, when executed, cause at least one processor of an electronic device to incorporate information from multi-modal embeddings in an indexed point-cloud data structure with 3D spatial information for a captured scene. The instructions, when executed, also cause the at least one processor of the electronic device to perform at least one of querying or retrieving 3D-point-cloud data based on a user input including at least one of natural language or image references. The instructions, when executed, further cause the at least one processor of the electronic device to enable global scene understanding and local scene understanding using instance segmentation in conjunction with the multi-modal embeddings.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIG. 14 illustrates an example retrieval process of data points from the data structure of FIG. 13 in accordance with this disclosure;

DETAILED DESCRIPTION

Figure 1:
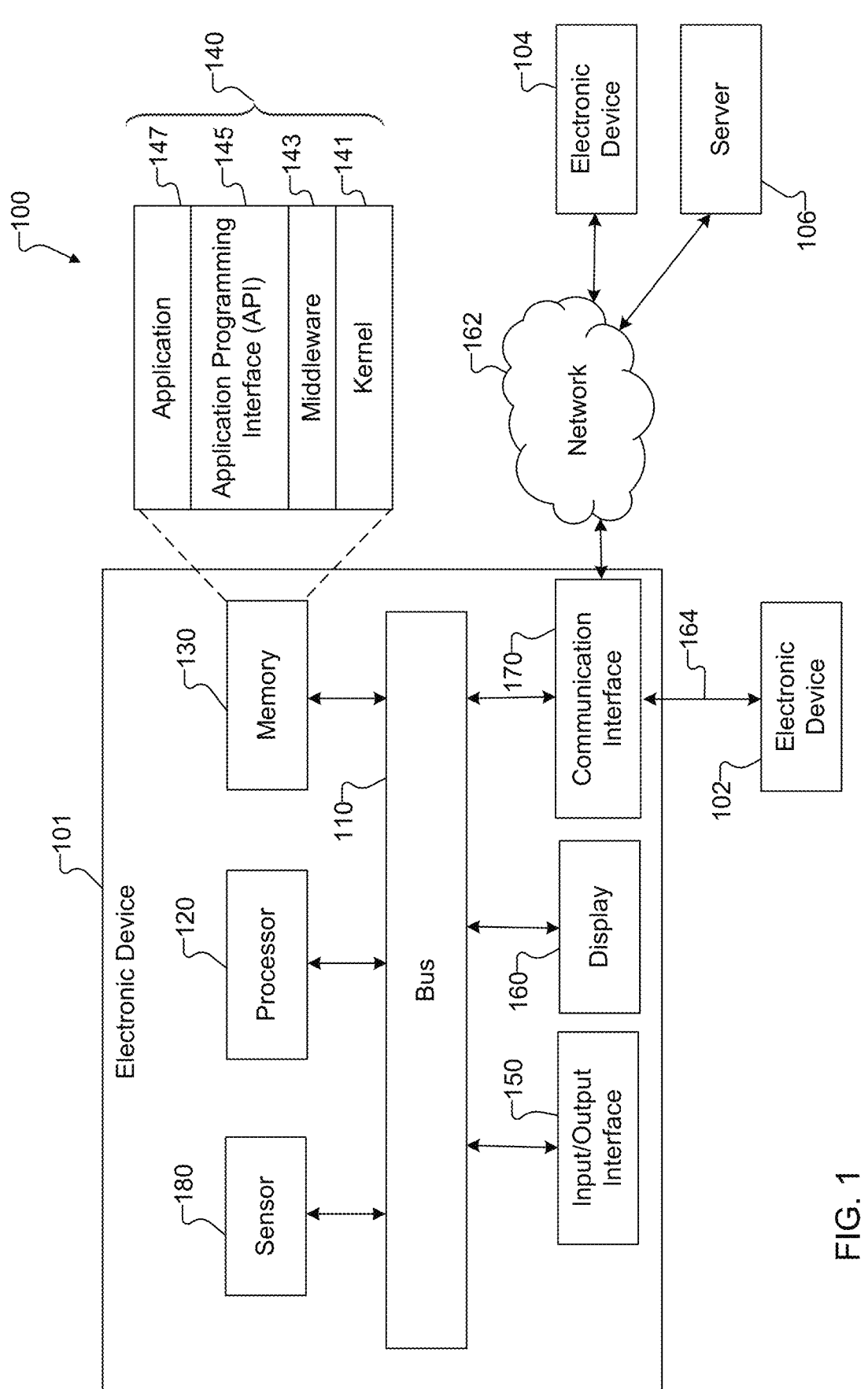
FIG. 1 illustrates an example network configuration including an electronic device in accordance with this disclosure.

FIGS. 1 through 25, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, owing to an influx of investment in the field of robotics and autonomous vehicles, three dimensional (3D) capture technology has seen huge improvements over the last decade with cost, size, complexity, and noise of sensing technology dramatically decreasing. This has opened new frontiers and use cases in consumer electronics that were previously impossible. The 3D data created by these technologies present new challenges in privacy, user experience, and processing that are largely unaddressed. 3D scanning is the process of capturing physical objects or environments to create a digital representation in the form of a 3D model. There are many techniques for 3D scanning, including contact scanning techniques such as the pantograph, and optical scanning techniques such as lidar, photogrammetry, and structured light.

Typically, 3D scans produce point clouds, which are discrete sets of 3D points and potentially appearance attributes such as color and intensity. Point clouds are a convenient representation for many applications, as being easily visualized and manipulated. However, point clouds also have some inherent limitations. For instance, point clouds are discrete, meaning that there is a finite number of points representing a scanned object or environment. This can lead to an incomplete representation, as small features or details may not be captured. Point clouds are typically large and not easily compressible. Point clouds are also unordered, meaning that there is no inherent ordering to the points that reflects position in the scanned object or environment.

Point clouds generated from 3D scans are also affected by various artifacts that can impact 3D model quality. Because of the inherent properties of 3D capture and point clouds, point clouds are unsuitable as is for a wide range of tasks such as computer aided design (CAD), augmented reality, simulation, and aesthetic presentation. Thus, one task of applications hoping to utilize point cloud data is to transform raw point cloud captures into a semantically equivalent continuous representation, such as a mesh or radiance field. These are not trivial tasks, and performing the tasks requires a good deal of technical expertise as well as sufficient computing power to ingest and process this data.

Compared to two-dimensional (2D) representations, which are images that are both continuous and ordered, meaning that both visualization and algorithms analyzing images are trivial in comparison, capturing point clouds is a difficult process. As noted above, point cloud data can be affected by various artifacts that can impact the quality of the resulting 3D model. These artifacts can include noise, holes, and outliers. Noise can result from inaccuracies in the scanning process, such as sensor noise or environmental interference. Holes can occur when parts of the scanned object or environment are not visible to the scanner, such as occluded areas or areas with insufficient lighting. Outliers can occur when there are points that do not belong to the scanned object or environment, such as debris or reflections. Like with 2D imaging, the scan resolution decreases with distance.

This disclosure improves the performance of 3D algorithms by leveraging the fact that nearby points in 3D space are most often related in meaningful ways, to produce spatial data structures allowing more efficiently storage and querying of 3D data. There are many possible approaches to this, with octrees being one example. Octrees are a data structure used for efficiently representing three-dimensional space. An octree divides the space into smaller and smaller cubes, each of which can be either empty or occupied by a point or an object. The root of the tree represents the entire space, while the leaves represent the smallest possible cubes. Octrees have applications in computer graphics and computer vision for tasks such as collision detection, ray tracing, and object rendering, but can also be used in geographic information systems (GIS) for spatial indexing and data compression. By using an octree, it is possible to reduce the number of calculations needed to perform the above-described segmentation, completion, hole filling, and meshing tasks, leading to faster and more efficient algorithms.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
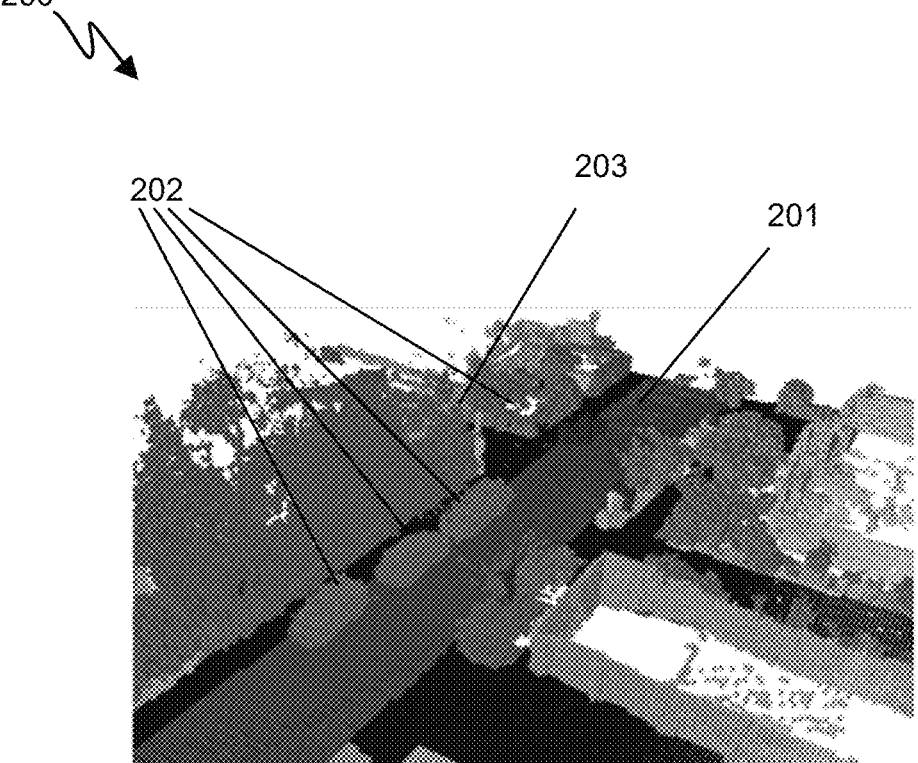
FIG. 2 illustrates an example of point cloud segmentation.
Figure 3A:
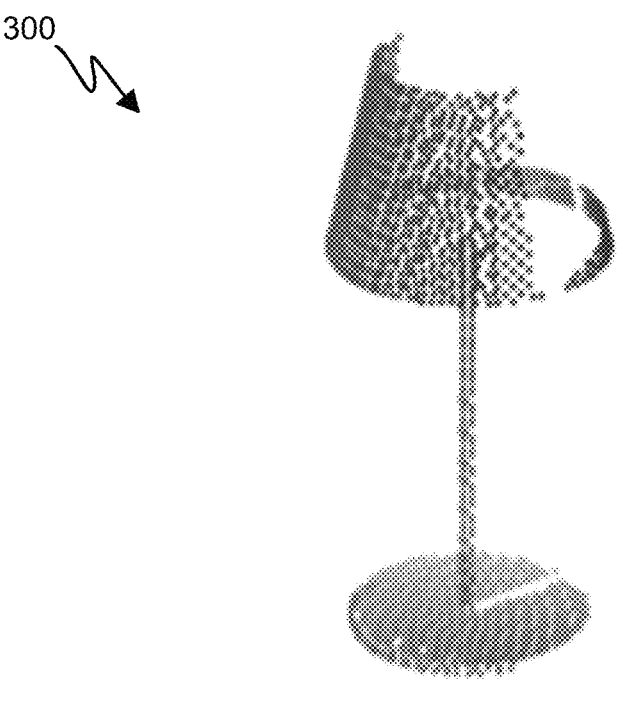
FIGS. 3A and 3B illustrate an example of point cloud completion.
Figure 3B:
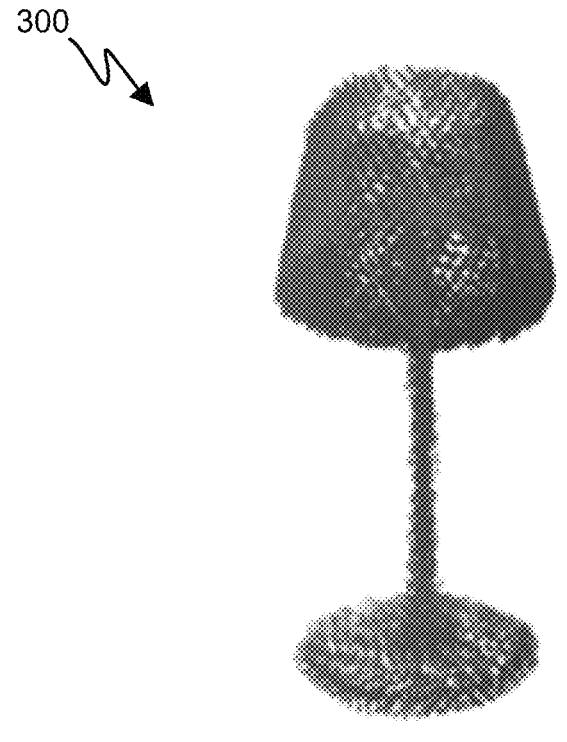
Figure 4A:
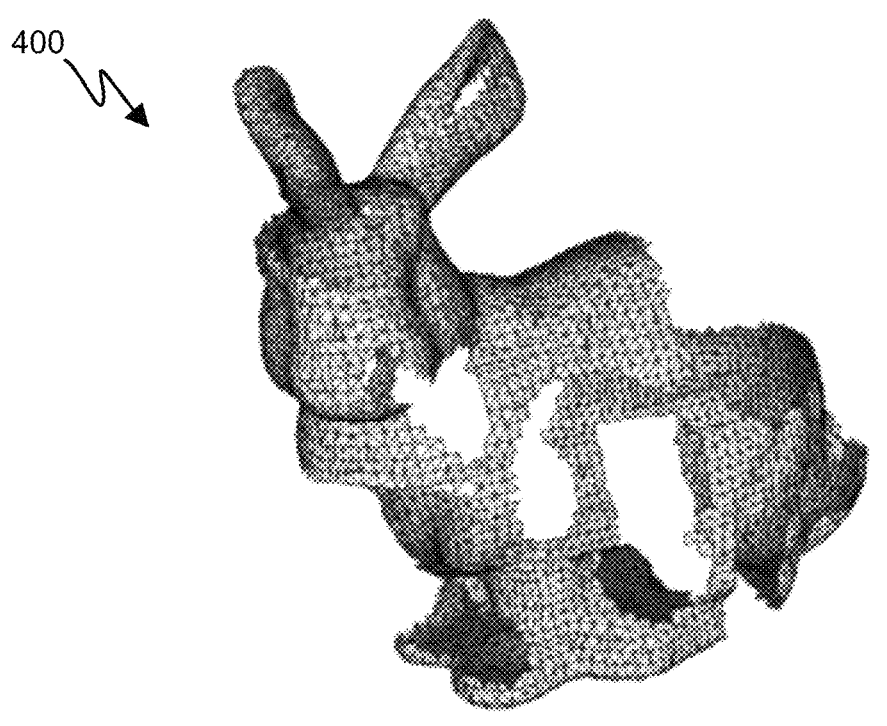
FIGS. 4A and 4B illustrate an example of point cloud hole filling.
Figure 4B:
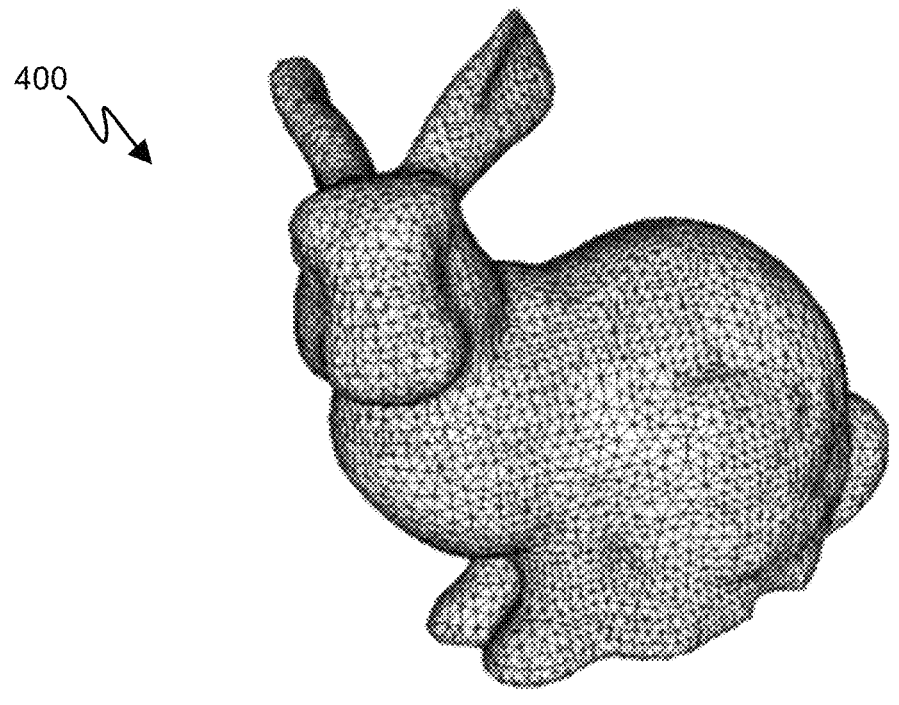
Figure 5A:
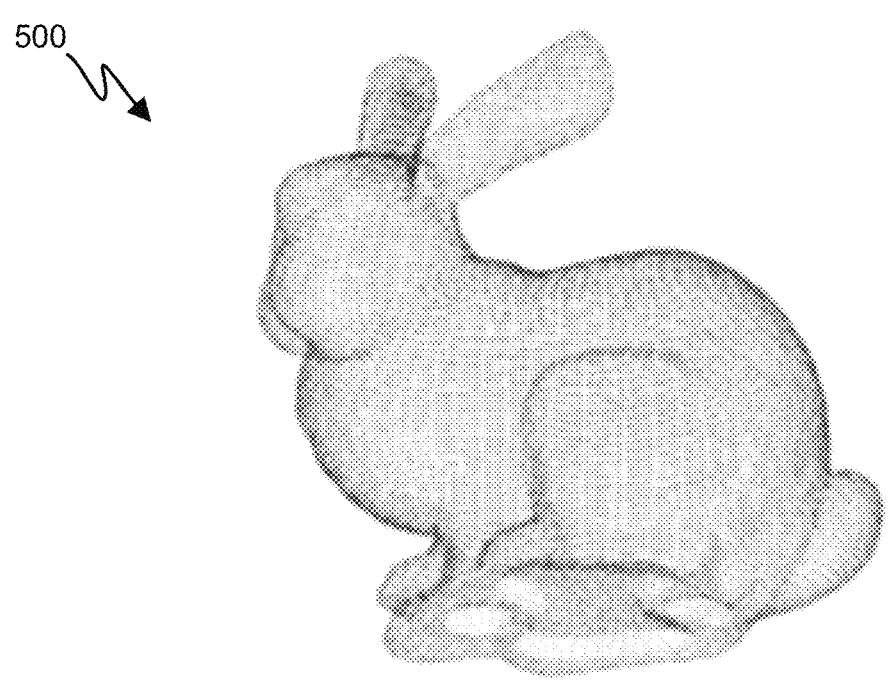
FIGS. 5A and 5B illustrate an example of point cloud meshing.
Figure 5B:
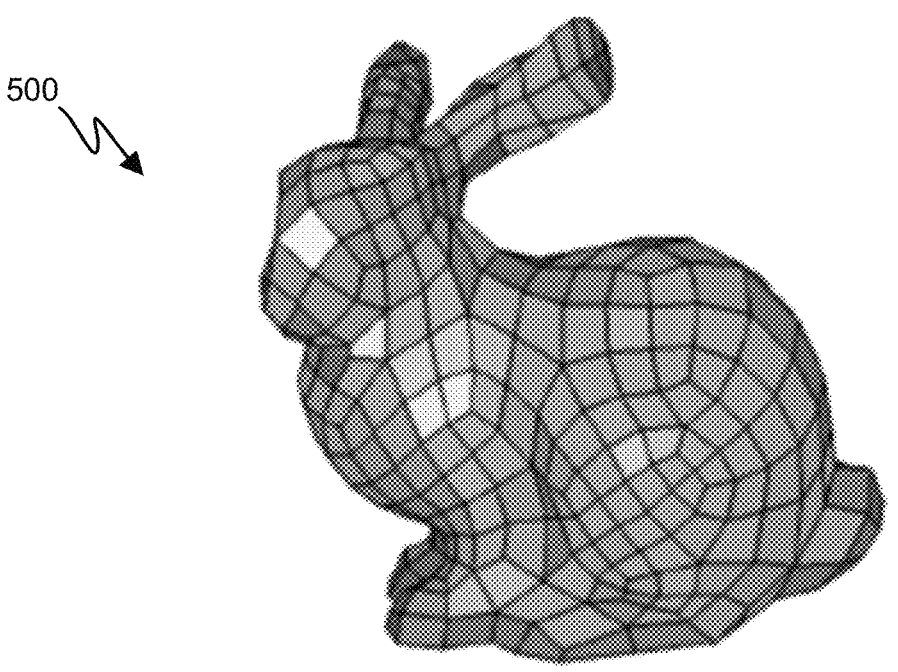

FIGS. 2 through 5B illustrate example transformations of 3D point cloud data in accordance with this disclosure. Before use, a number of transformations can be made to 3D point cloud data. Outlier elimination, hole filling, completion, meshing, and segmentation can all be performed as initial processing steps. FIG. 2 illustrates an example 200 of segmentation, in which points within the point cloud are logically divided based on the feature represented, such as a street 201, cars 202 parked on the street, and buildings 203 adjacent to the street in the example shown. FIGS. 3A and 3B illustrate an example 300 of completion, in which a point cloud is recognized as an incomplete representation and additional points are added. For example, the partial representation of a floor lamp shown in FIG. 3A has points added based on projected symmetry to produce the point cloud shown in FIG. 3B. FIGS. 4A and 4B illustrate an example 400 of hole filling. The point cloud for a rabbit shown in FIG. 4A is perceived, based on projected surface continuity, to be missing points that are added to form the point cloud shown in FIG. 4B. FIGS. 5A and 5B illustrate an example 500 of meshing, where the apparent surfaces of a (complete) rabbit shown in FIG. 5A is converted into smaller polygonal surface shapes as shown in FIG. 5B. Once a mesh has been constructed, traditional editing and rendering techniques can be employed to present the 3D data for use by applications.

Although FIGS. 2 through 5B illustrate examples of transformations of 3D point cloud data, various changes may be made to FIGS. 2 through 5B. For example, the 3D point clouds shown can be of a variety of subjects, and the subjects shown in FIGS. 2 through 5B are merely examples. In general, 3D point cloud data can come in a wide variety of arrangements, and FIGS. 2 through 5B do not limit the scope of this disclosure to any particular arrangements of 3D point cloud data.

Figure 6A:
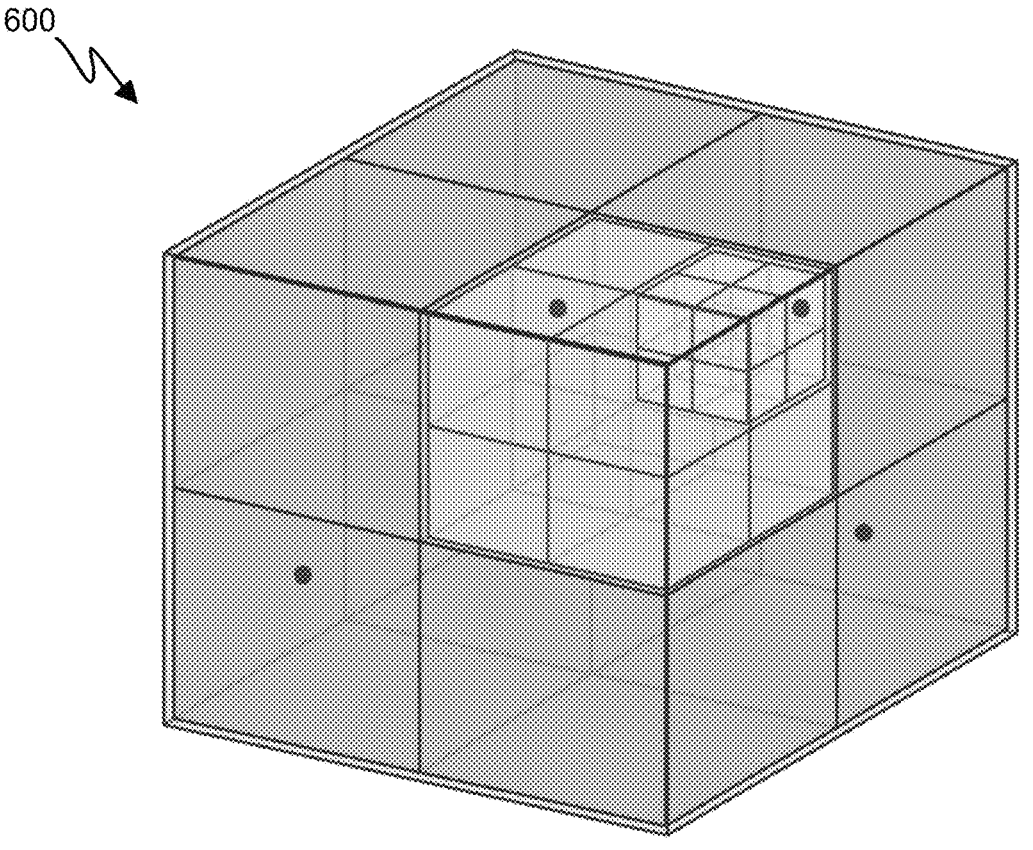
FIGS. 6A and 6B illustrate an example octree process in accordance with this disclosure.
Figure 6B:
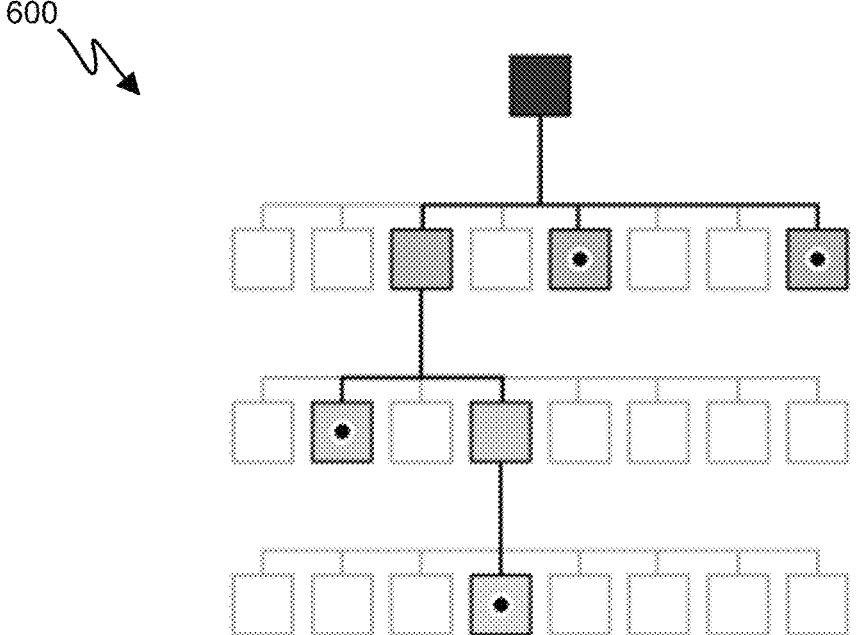

FIGS. 6A and 6B illustrate an example octree process 600 in accordance with this disclosure. As described above, this disclosure improves the performance of 3D algorithms by leveraging the fact that nearby points in 3D space are most often related in meaningful ways, to produce spatial data structures allowing more efficiently storage and querying of 3D data. There are many possible approaches to this, with octrees being one example. Octrees are a data structure used for efficiently representing three-dimensional space. As shown in FIG. 6A, the process 600 involves using an octree to divide a 3D space into smaller and smaller cubes, each of which can be either empty or occupied by a point or an object. As shown in FIG. 6B, the process 600 further includes creating an octree spatial data structure corresponding to the divided 3D space. This octree spatial data structure is hierarchical, with each level of the tree representing a different level of detail. The root of the tree represents the entire space, while the leaves represent the smallest possible cubes. As noted above, octrees have applications in computer graphics and computer vision for tasks such as collision detection, ray tracing, and object rendering, but can also be used in geographic information systems (GIS) for spatial indexing and data compression. By using an octree, it is possible to reduce the number of calculations needed to perform the above-described segmentation, completion, hole filling, and meshing tasks, leading to faster and more efficient algorithms.

The octree concepts described above can be applied to natural language 3D searching. In order to work with text (e.g., "natural language") in a machine learning setting, a mathematical representation—known as language or word embeddings—that preserve the meaning of objects must be devised. One approach would involve simply going through the English dictionary and assigning an ordinal identifier (aardvark=00000001, and so on) to each word, but this has a number of shortcomings. This low dimensional representation only encodes the alphabetical order of the words, and says nothing about the meaning, frequency, part of speech, context etc. The fact that "aardvark" is assigned 00000000000000000000000000000001 and the word "final" is assigned 00000000000000010001000101110000 encodes very little useful information. To improve upon this, the encoding system may be extended into more dimensions. By projecting words into a higher dimensional space (e.g., $R^{300}$), the geometric relationships between points encodes a rich set of information such as the part of speech, word origin, lexical semantics etc. In this space, math can effectively "be done" with words. For instance, in an embedding space, king+woman might equal queen, and so forth.

While useful in many applications such as search, word embeddings are insufficiently rich for many tasks. Because word embeddings are context insensitive, words like "bat" will map to the same point in embedding space regardless of whether used to refer to the animal or the object used to play baseball. To address this, sentence embedding models that encode entire sentences into a meaningful vector representation have been developed. For example, these embeddings allow determination that "What is the capital of the US?" is more closely related to "Washington, D.C. [ . . . ] is the capital of the United States" than "Capital punishment [ . . . ] has existed in the US [ . . . ]."

Because these embedding models are derived from huge corpuses of text, the embeddings capture many of the subtleties and vagaries of human language, and are able to develop "common sense." For instance, the embedding for the sentence, "make me dinner" will inhabit a space similar to words like "kitchen," "countertop," "microwave." "food," etc., because these words frequently appear with the word "dinner" in the training corpus. This allows deployment of systems with a rich, albeit shallow, understanding of the world.

Just as with natural language, image data must also be encoded in a format suitable for machine learning tasks. Digital imagery comes in many shapes, sizes, formats, and of course encodes an incredibly rich set of information. The task of an image encoder is to normalize image data and represent the image in a reduced form that preserves the "meaning" of the data. What this embedding representation actually captures is entirely task dependent—the embedding could represent objects in the image, the style of artwork, the type of camera a photo was captured with, etc.

Figure 7:
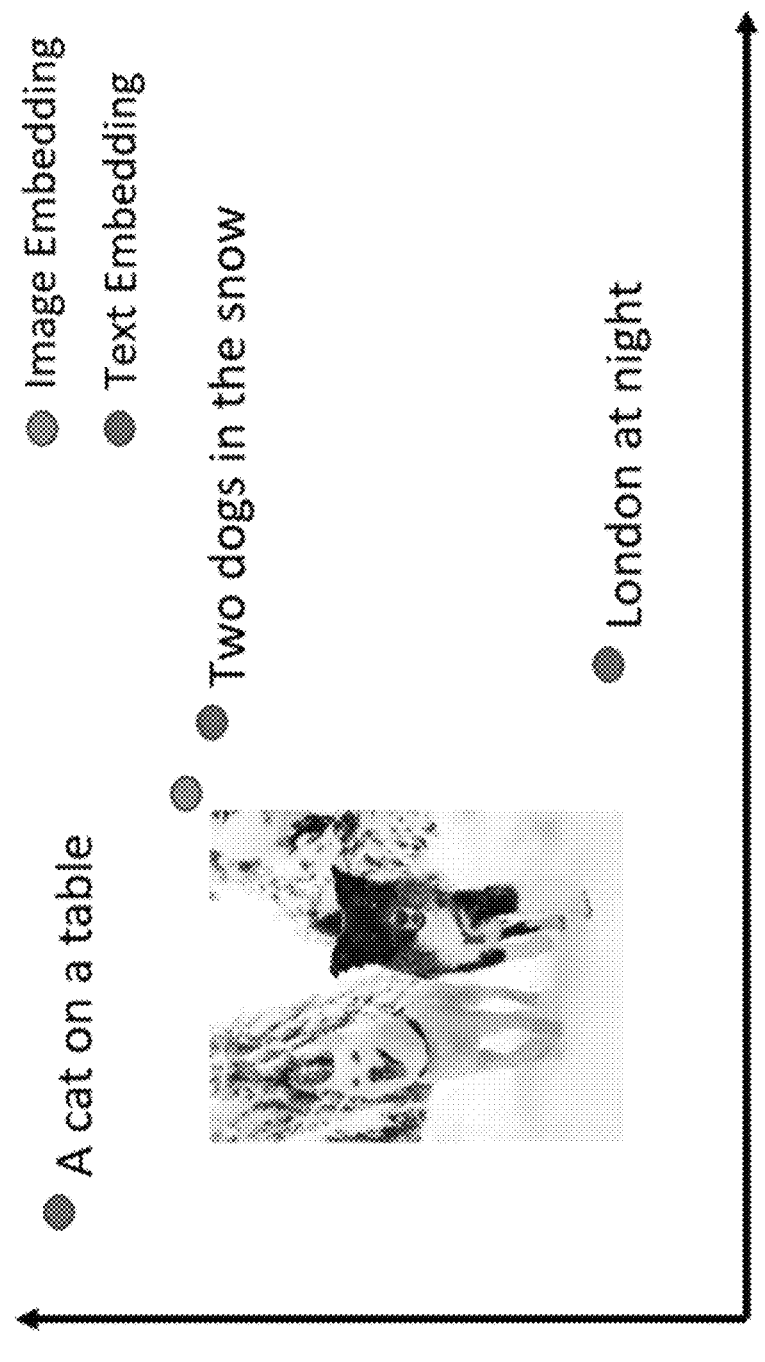
FIG. 7 illustrates an example comparison between image representations and language representations in accordance with this disclosure.

FIG. 7 illustrates an example comparison 700 between image representations and language representations in accordance with this disclosure. Image embeddings can be jointly learned with sentence embeddings as illustrated in FIG. 7, such that language and image representations can be directly compared. This allows identification of an image as being of a dog, but not of a black dog. Previous image classification approaches were limited in generality by the need of researchers to manually label and model a vast space of visual concepts. This joint language representation allows huge corpuses of pre-captioned imagery to be leveraged to create very nuanced and sensitive image classifiers.

Figure 8:
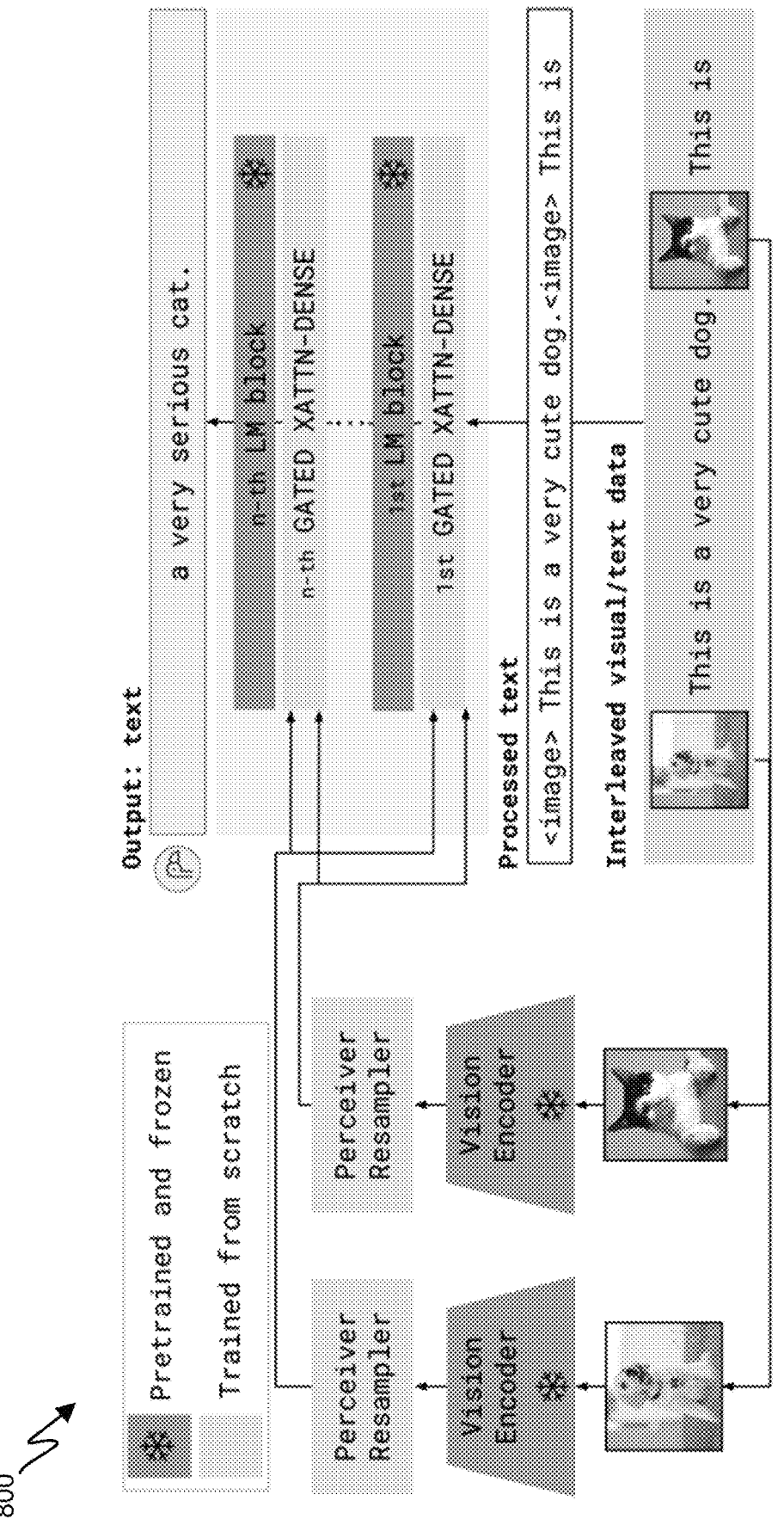
FIG. 8 illustrates an example process for projecting visual and language features into a shared embedding space in accordance with this disclosure.

FIG. 8 illustrates an example process 800 for projecting visual and language features into a shared embedding space in accordance with this disclosure. Research into visual language models (VLMs) has been motivated by use cases in a wide range of fields such as search, e-commerce, customer support, robotics, and media accessibility. In short, these models work by interleaving and projecting visual and language features into a shared embedding space as illustrated in FIG. 8, thereby creating a joint representation that can be used by standard machine learning models such as multilayer perceptron (MLP) models. These models typically only work on 2D data such as images and videos, as there are massive readily available corpuses of annotated 2D media. Deep learning primitives such as convolutional neural networks (CNNs) are well understood and amenable to 2D imagery.

Figures 9A, 9B:
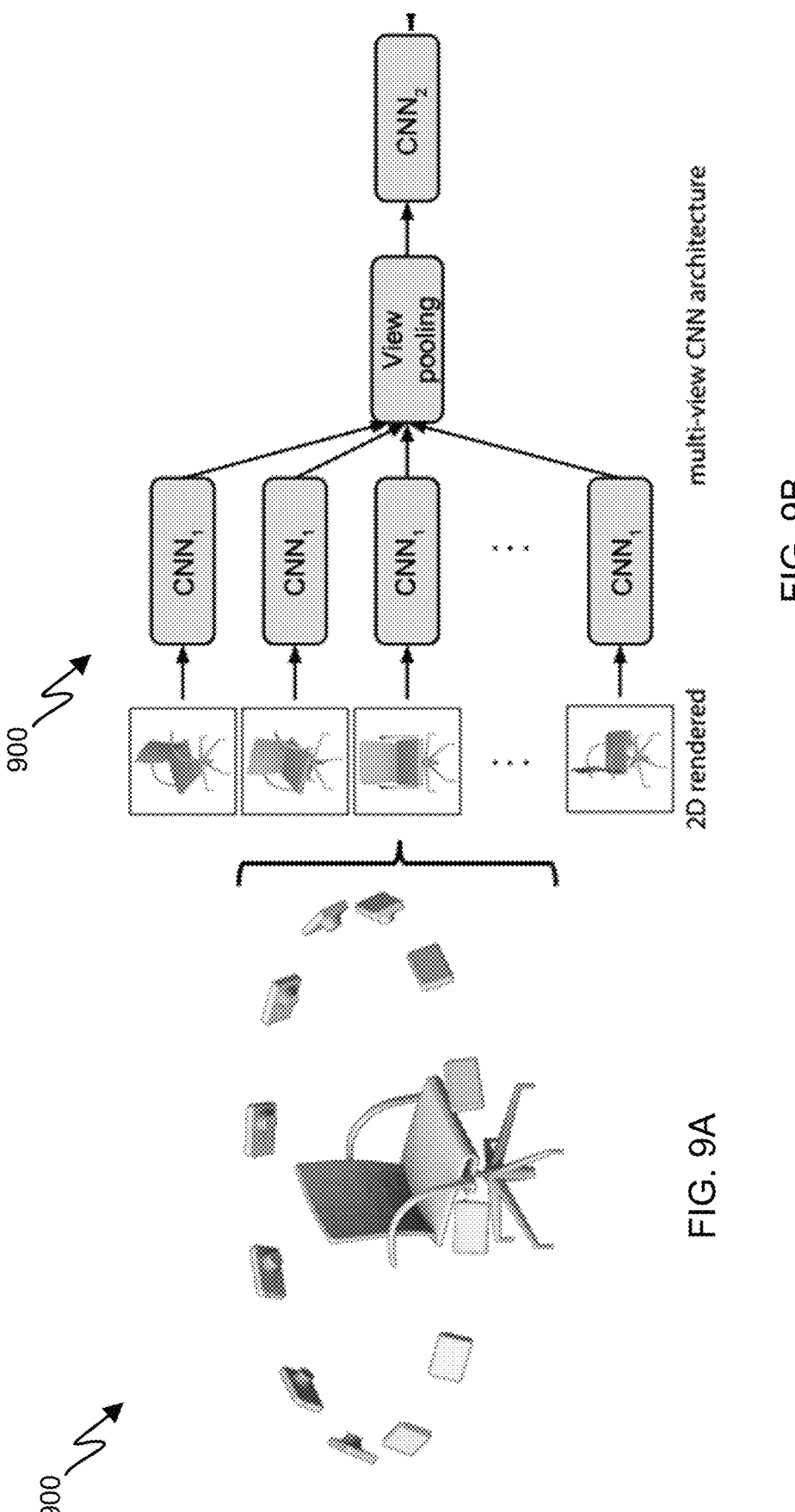
FIGS. 9A and 9B illustrate an example 3D projection process in accordance with this disclosure.

FIGS. 9A and 9B illustrate an example 3D projection process 600 in accordance with this disclosure. To extend these models into 3D space, an algorithm is applied to explore space and project 3D data down to 2D from multiple vantage points as illustrated in FIGS. 9A and 9B. The selection of samples is a very important factor in both the quality of results and the time-performance of the algorithm. Each 2D sample is then fed to the network. However, problems can arise with the above-described approach because 3D data is a rich data format that encodes structural and visual information over arbitrarily large regions of space. Every facet of a room or object can be captured, measured, and communicated with this data. As with any data of this complexity, navigating and understanding the data is a difficult task for experts and laymen alike, even more so when done on devices with 2D touch interfaces such as a phone or tablet. Even in desktop environments, experts use "3D mice" to make navigation more efficient.

In addition, searching through large sets of "non-language-data" is challenging, and even more so when the data cannot be easily inspected at a glance, such as being presented 100 movie files and being asked to find a car in a single frame. Further, users are reluctant to share full scans of their home with third parties: This data potentially exposes many intimate details about a person such as medical conditions, hobbies, relationships, cleanliness, wealth, and more. Still further, files produced by various 3D capture technologies are very large, often reaching gigabytes in size. Third parties looking to utilize this data will have a difficult time ingesting, processing, understanding, and storing the data. Furthermore, many users live in areas with poor internet access, degrading the experience and viability of such applications.

Figures 10A, 10B:
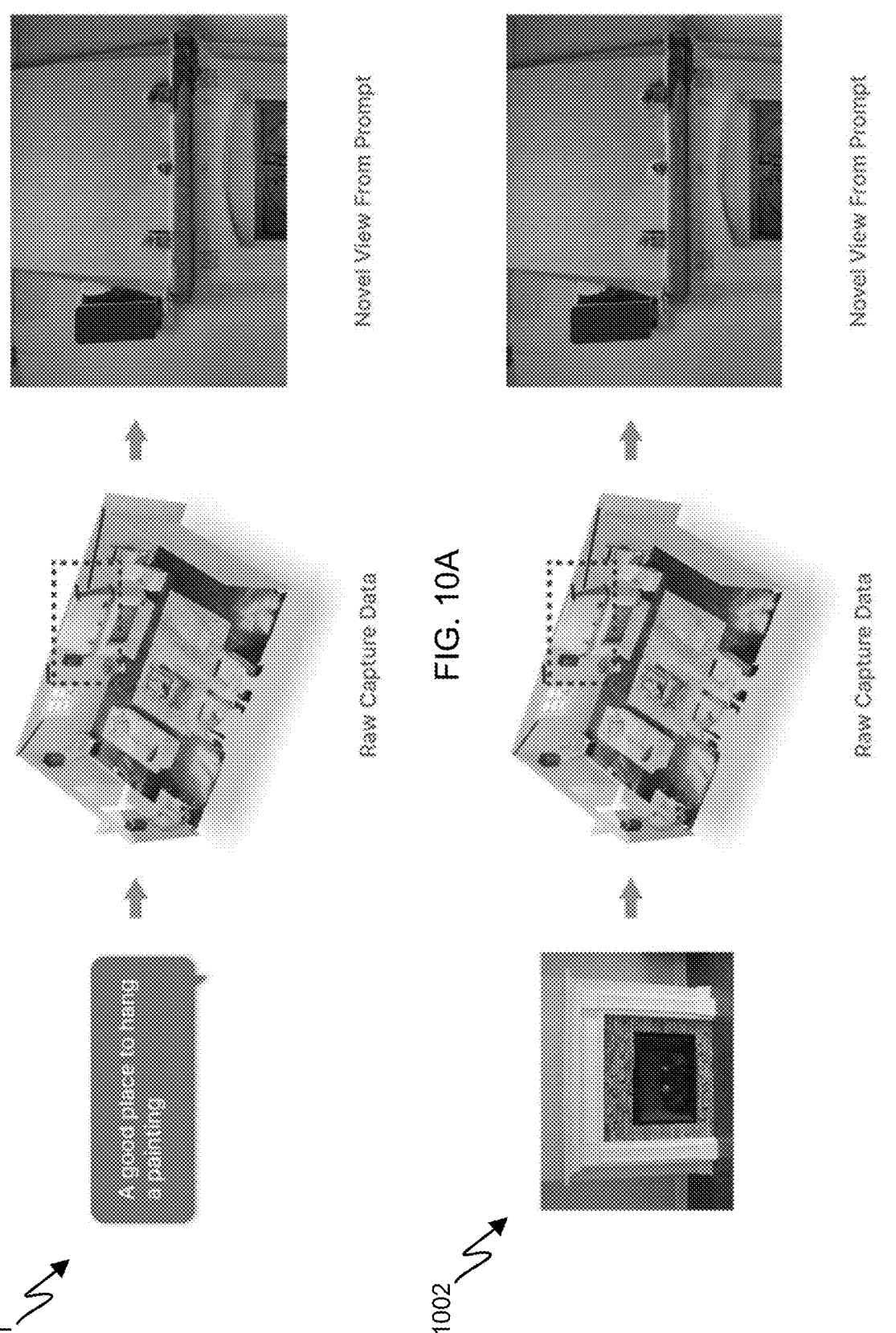
FIGS. 10A and 10B illustrate examples of natural language 3D captures in accordance with this disclosure.

The present disclosure provides a system that allows users/application programming interfaces (APIs)/agents (collectively referred to herein as "users") to navigate and extract data from 3D captures using a constructed language or natural language interface. For example, FIGS. 10A and 10B illustrate examples of natural language 3D captures in accordance with this disclosure. As provided in this disclosure, users can make potentially vague open-ended requests such as "a good place to hang a painting" as shown in FIGS. 10A and 10B, and automatically locate a subset of the data that matches the query.

Depending on the use-case, more processing can be done to add/subtract information, refine the rendered view, generate relevant metrics, and more. This functionality simplifies interacting with 3D data, allows users to preserve privacy, and dramatically reduces the amount of data sent over the wire or rendered to the screen. In this example, users capture 3D information with a variety of devices, and store the 3D information on a secure (local or remote) device, where the 3D information is then pre-processed to generate a spatial database capable of retrieving subsets of the point cloud using language or visual queries. For instance, given a point cloud of an Ikea store, the user could query "the long white couch," or provide an image of a similar couch and retrieve the associated subset of the point cloud. In the particular example 1001 of FIG. 10A, natural language is provided of "a good place to hang a painting," one result might identify a large, open wall space as shown in FIG. 10A, while another result might identify a feature such as a fireplace and indicate the space above that feature (whether occupied or empty) as shown in the example 1002 of FIG. 10B.

Although FIGS. 10A and 10B illustrate examples of natural language 3D captures in accordance with this disclosure, various changes may be made to FIGS. 10A and 10B. For example, the natural language provided, the 3D scene involved, and the determinations as to appropriate aspect of the 3D scene that correspond with the natural language can vary depending upon implementation or the particular use environment.

Figure 11:
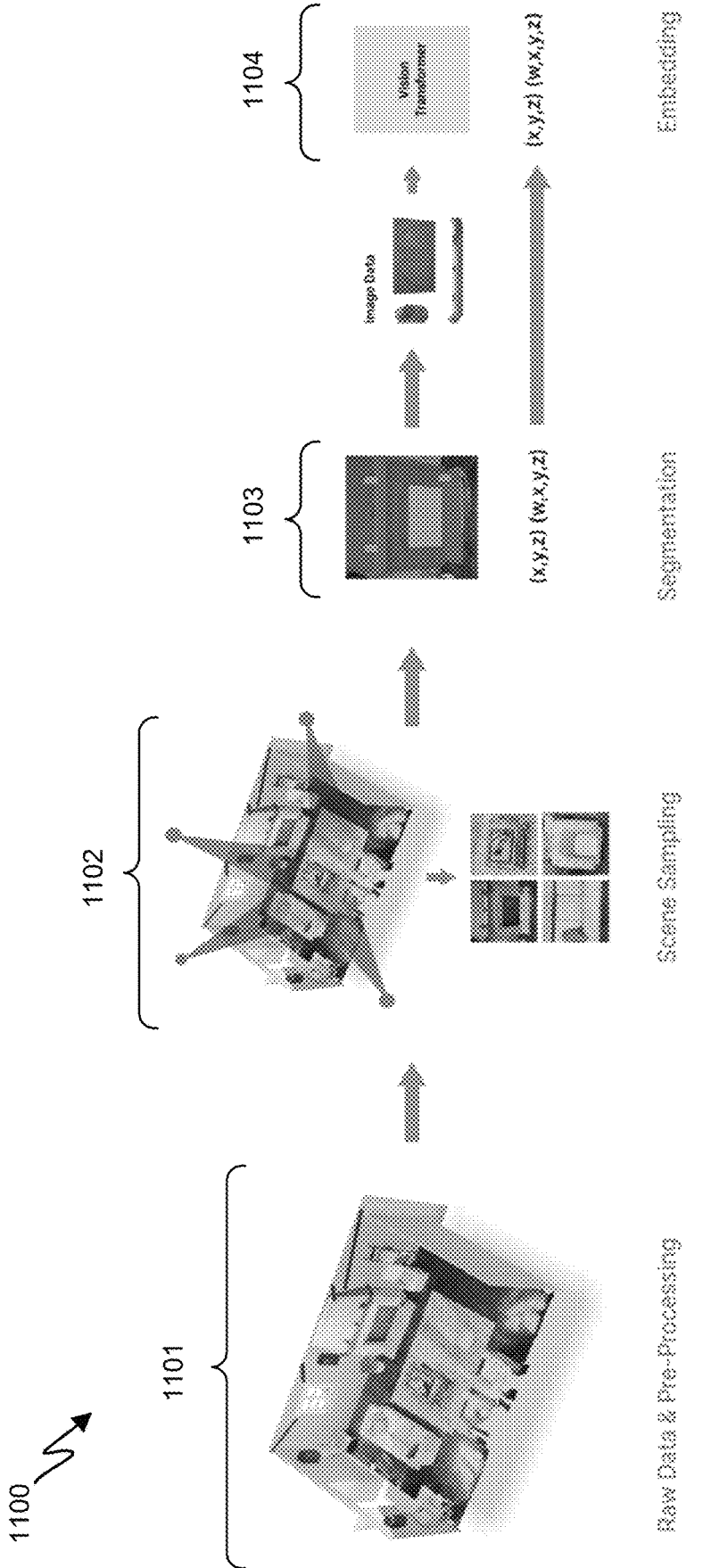
FIG. 11 illustrates an example process for natural language 3D searching in accordance with this disclosure.

FIG. 11 illustrates an example process 1100 for natural language 3D searching in accordance with this disclosure. For ease of explanation, the process 1100 shown in FIG. 11 is described as being implemented on or supported by the electronic device 101 in the network configuration 100 of FIG. 1. However, the process 1100 shown in FIG. 11 could be used with any other suitable device(s) and in any other suitable system(s), such as when the process 1100 is implemented on or supported by the server 106.

As shown in FIG. 11, the 3D data is captured and pre-processed via a pre-processing function 1101, generating a complete mesh with as little noise and few artifacts as possible. The system then captures many 2D samples, via a scene sampling function 1102, from the point cloud, completely exploring the space and generating a representative summary of the model. Next, each of the 2D samples are fed to a segmentation function 1103 that identifies and extracts subsets ((x, y, z), (w, x, y, z)) of the image. The image samples are then passed into a pre-trained image encoder that performs an embedding function 1104, embedding the data into a shared latent space. Finally, the source point cloud ID, the point cloud subset contained in the 2D samples, and the embeddings are stored in a spatial database for later retrieval.

Although FIG. 11 illustrates one example process 1100 for natural language 3D searching, various changes may be made to FIG. 11. For example, various components and functions in FIG. 11 may be combined, further subdivided, replicated, or rearranged according to particular needs. Also, one or more additional components and functions may be included if needed or desired.

Figure 12:
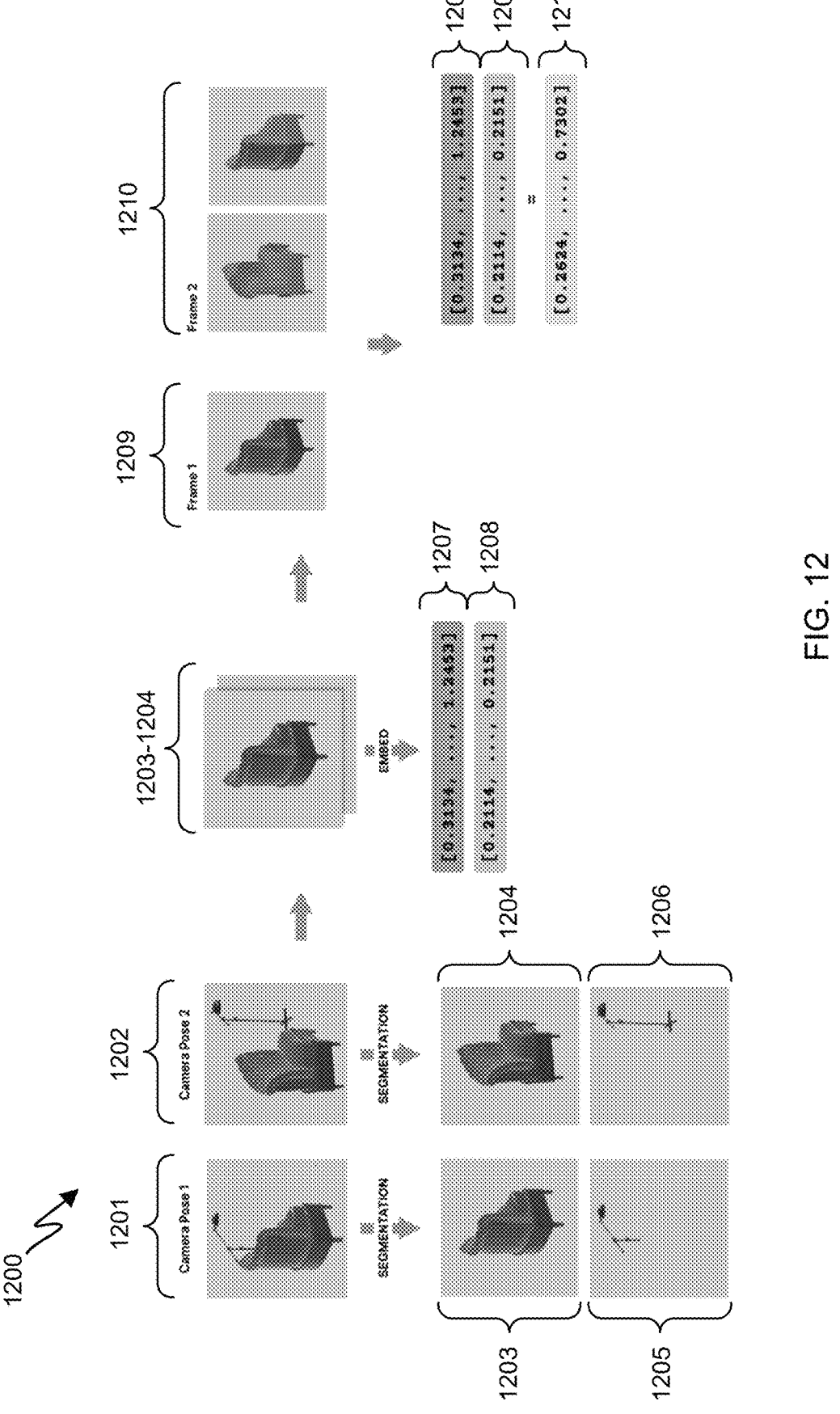
FIG. 12 illustrates a process for deriving natural language 3D search data in accordance with this disclosure.

FIG. 12 illustrates a process 1200 for deriving natural language 3D search data in accordance with this disclosure. For ease of explanation, the process 1200 shown in FIG. 12 is described as being implemented on or supported by the electronic device 101 in the network configuration 100 of FIG. 1. However, the process 1200 shown in FIG. 12 could be used with any other suitable device(s) and in any other suitable system(s), such as when the process 1200 is implemented on or supported by the server 106.

It will be understood that the embodiment shown in FIG. 12 is for illustration only. Other embodiments of the process 1200 could be used without departing from the scope of this disclosure. The process 1200 begins with multiple views 1201, 1202 of an environment that, in the example shown, includes an armchair next to a floor lamp. Each view 1201, 1202 is then segmented into portions 1203, 1204 corresponding to one object (the armchair) in the environment and portions 1205, 1206 corresponding to the other object (the floor lamp). Every 3D point from the segmented images 1203-1204 for an object is then assigned the embedding vector 1207, 1208 for the entire segmentation within which the segmented image is contained.

For each frame 1209, a check is made as to whether any points are also contained in a previously-processed frame. If not (e.g., for the first frame processed), all points receive the same new group identifier (ID). If there is overlap between two frames 1210, all points from the frame currently being processed are assigned the previously-assigned group ID. The embeddings 1207, 1208 from the overlapping images are then unified by averaging 1211.

Although FIG. 12 illustrates one example process 1200 for deriving natural language 3D search data, various changes may be made to FIG. 12. For example, various components and functions in FIG. 12 may be combined, further subdivided, replicated, or rearranged according to particular needs. Also, one or more additional components and functions may be included if needed or desired.

Figure 13:
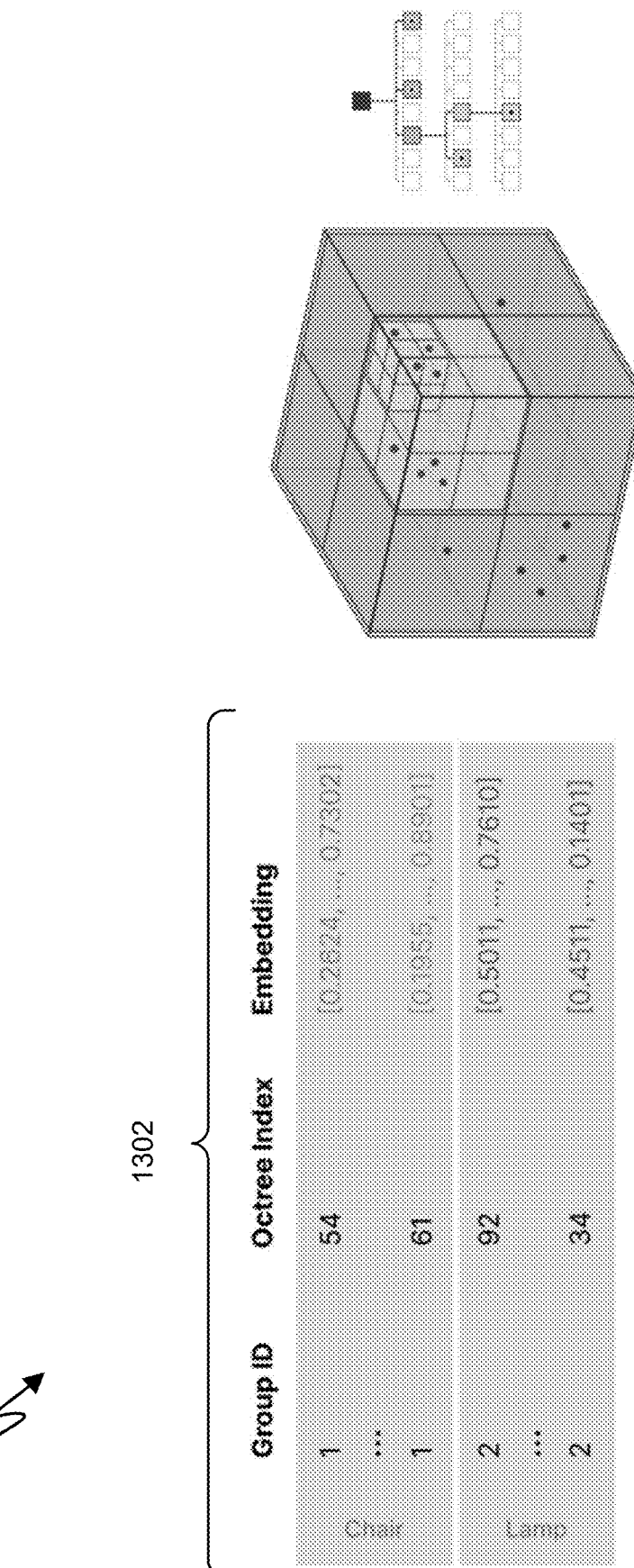
FIG. 13 illustrates an example output corresponding to the process of FIG. 12 in accordance with this disclosure.

FIG. 13 illustrates an example output 1300 corresponding to the process 1200 of FIG. 12 in accordance with this disclosure. For ease of explanation, the output 1300 shown in FIG. 13 is described as provided by the electronic device 101 in the network configuration 100 of FIG. 1. However, the output 1300 shown in FIG. 13 could be used with any other suitable device(s) and in any other suitable system(s), such as when the process 1200 is implemented on or supported by the server 106.

The process 1200 of FIG. 12 results in a set, for each group ID, of octree indices and corresponding embeddings. After the process 1200, a data structure 1302 is provided that captures the grouping of points and the image embeddings. An octree data structure is used to compress this data structure 1302, as many neighboring points will share a grouping an embedding. Thus, voxels can be stored, instead of individual points.

Although FIG. 13 illustrates one example output 1300, various changes may be made to FIG. 13. For example, various components and data in FIG. 13 may be combined, further subdivided, replicated, or rearranged according to particular needs. Also, one or more additional components and data may be included if needed or desired.

FIG. 14 illustrates an example retrieval process 1400 of data points from the data structure of FIG. 13 in accordance with this disclosure. For ease of explanation, the process 1400 shown in FIG. 14 is described as being implemented on or supported by the electronic device 101 in the network configuration 100 of FIG. 1. However, the process 1400 shown in FIG. 14 could be used with any other suitable device(s) and in any other suitable system(s), such as when the process 1400 is implemented on or supported by the server 106.

As shown in FIG. 14, to retrieve points, the query ("the chair next to the lamp," in the example shown) is first embedded at step 1401, and then a scan is performed over the embedded entries within the data structure 1302. Entries that have a similarity score below an implementation-defined threshold are then discarded. When an entry exceeds the threshold, however, that entry and all other entries in the group are returned as query results 1402. The result of querying the data structure 1302 is a set of segmented point clouds 1404 that matched the query. The final group can then be selected on the basis of any of a number of metrics, such as aggregate confidence, size, proximity, etc.

Although FIG. 14 illustrates one example retrieval process 1400 of data points, various changes may be made to FIG. 14. For example, various components and functions in FIG. 14 may be combined, further subdivided, replicated, or rearranged according to particular needs. Also, one or more additional components and functions may be included if needed or desired.

Figure 15:
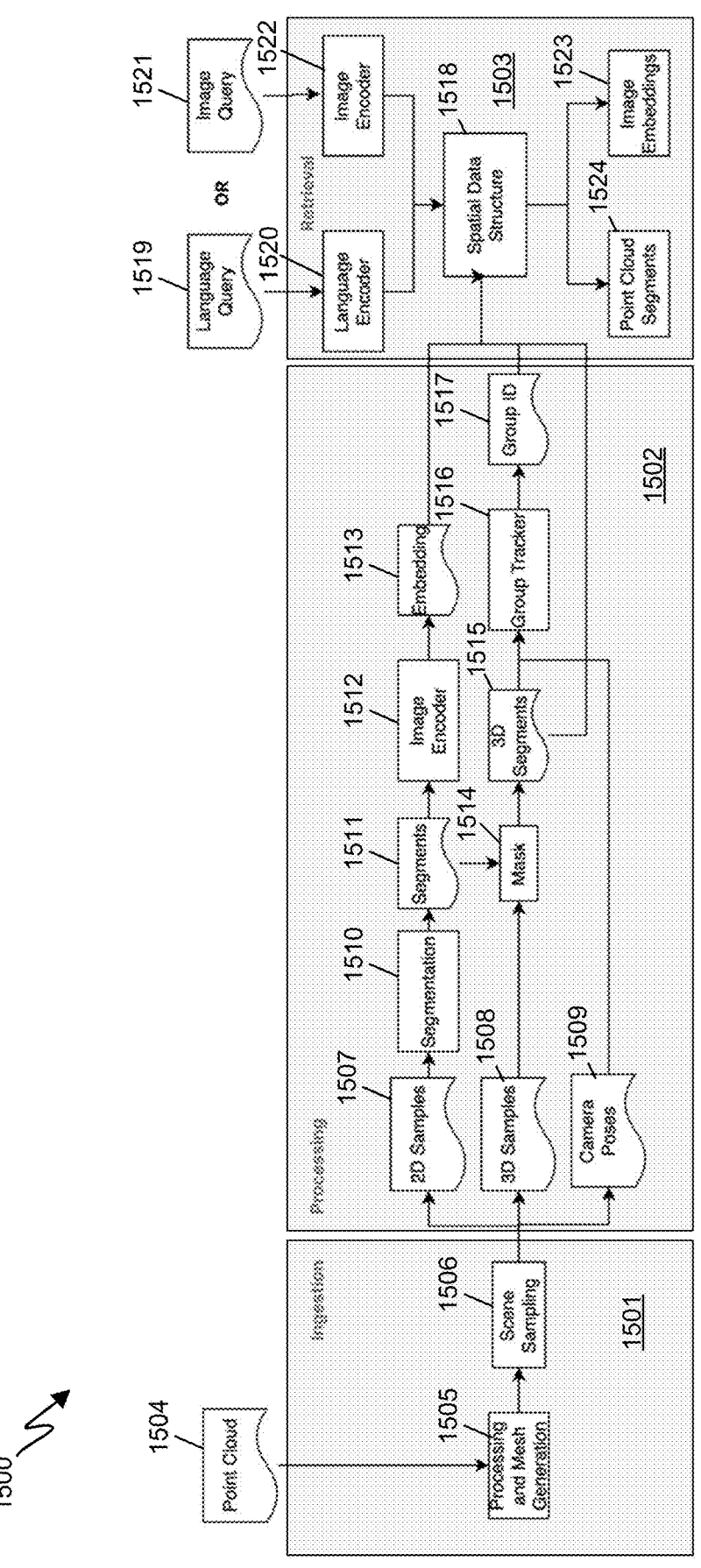
FIG. 15 illustrates an example process for ingestion, deriving natural language 3D search data, and retrieval in accordance with this disclosure.

FIG. 15 illustrates an example process 1500 for ingestion, deriving natural language 3D search data, and retrieval in accordance with this disclosure. For ease of explanation, the process 1500 shown in FIG. 15 is described as being implemented on or supported by the electronic device 101 in the network configuration 100 of FIG. 1. However, the process 1500 shown in FIG. 15 could be used with any other suitable device(s) and in any other suitable system(s), such as when the process 1500 is implemented on or supported by the server 106.

The embodiment shown in FIG. 15 is for illustration only. Other embodiments of the process 1500 could be used without departing from the scope of this disclosure. The complete ingestion and retrieval process 1500 is logically arranged as broken into three blocks: ingestion 1501; processing 1502; and retrieval 1503. Ingestion 1501 and processing 1502 correspond generally to the process illustrated by FIG. 12, producing the data structure of FIG. 13, while retrieval corresponds generally to the process illustrated by FIG. 14, operating on the data structure of FIG. 13.

Ingestion 1501 begins by receiving point cloud data 1504. The process is agnostic to the particular capture technology, requiring only that the point cloud data 1504 contain color data. Optionally, the process also takes real-world camera poses used in capturing the data. During ingestion 1501, processing and mesh generation 1505 is performed on the point cloud data 1504, and scene sampling 1506 is performed on the output of such processing and mesh generation 1505.

Scene sampling 1506 projects the 3D data into 2D samples 1507, which may be used in conjunction with 3D samples 1508 and camera poses 1509. During processing 1502, each 2D sample is passed to a segmentation algorithm 1510 that identifies and extracts objects from the image, producing segments 1511 corresponding to the objects. The extracted image segments 1511 are then encoded with a pre-trained encoder 1512, which generates embeddings 1513 for each encoded image segment. A mask 1514 based on the segments 1511 is applied to the 3D samples 1508 to produce 3D segments 1515. For every 2D sample, a check is performed by group tracker 1516 as to whether any of the 3D points corresponding to the 3D point have been processed. If so, any new points contained in the 2D sample are added to the existing group ID 1517; otherwise, a new group identifier 1517 is created for the 2D sample.

The embeddings 1513, points, and group ID 1517 are stored in a spatial data structure 1518 such as a K-dimensional tree (kd-tree), octree, or the like. During retrieval 1503, users and applications can query this spatial data structure 1518 by passing the input language query 1519 or visual query 1521 through a language encoder 1520 or image encoder 1522 (which operates in a manner corresponding to image encoder 1512). Once the query has been encoded, the database can be searched, and some similarity metric such as cosine-similarity can be applied to find candidate entries. These entries are then returned along with the associated meta data (image embeddings) 1523 and point cloud data segments 1524.

Obtaining representative 2D samples from the raw data during scene sampling 1506 is an important component in the final solution. A sample efficient method is needed, meaning that neither too many nor too few samples are collected to capture all of the relevant features of the input point cloud. Too few (or non-representative samples) will result in poor recall ability. Too many samples requires significantly more computational resources to be utilized. A few different approaches can be taken.

Scene sampling may simply leverage the real-world camera poses that were used to capture the 3D space. Depending on the capture methodology, there will be a number of camera poses that can be extracted via simultaneous localization and mapping (SLAM) or other existing photogrammetry techniques (e.g., FIGS. 9A-9B or consideration of near/far clip planes). This has the advantage of being closely aligned with a user's focus—areas of a space that the user is interested in will likely receive more and higher resolution imaging. This approach also allows an algorithm to better calibrate for scale of the space an object in focus.

That approach to scene sampling can be improved upon by tracking which parts of the point cloud have been sampled and at what resolution. Using the real-world poses as starting points, and an off-the-shelf spatial hashing algorithm, the space can be explored while keeping track of what has and has not been sampled.

In performing segmentation 1510 for purposes of embedding 1513, the embedding models discussed earlier provide no way to identify regions of interest or demarcate objects within a scene, but instead only provide directly comparable mathematical representations of disparate classes of objects. Existing 2D semantic segmentation models may be leveraged to identify and extract subsets of the 3D data to index. These models take many forms, and some can generate segmentations with a discrete set of class labels (e.g., "tree," "dog," "chair") for segments, while others simply produce masks without any indication of the nature of the segmented object.

Figures 16A, 16B:
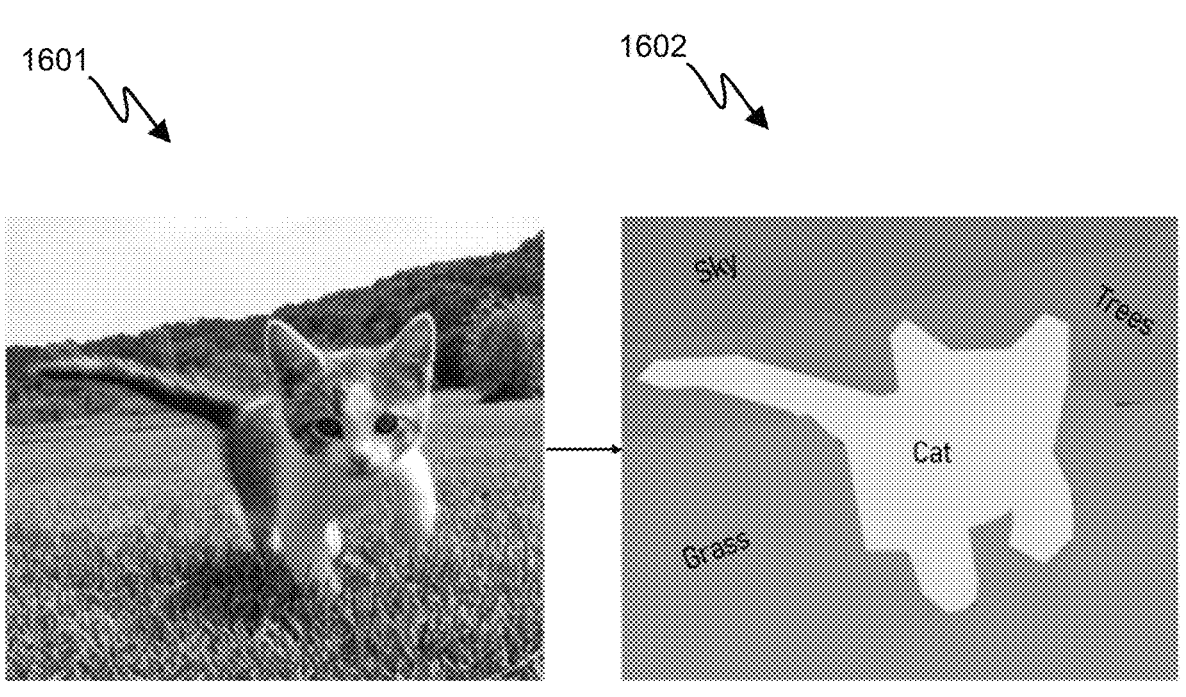
FIGS. 16A and 16B illustrate an example image segmentation in accordance with this disclosure.

Within process 1500, no assumption is made about the type of segmentation being performed. Depending on the application, the process 1500 can employ semantic segmentation, instance segmentation, part segmentation and so on. Applications may even choose to use an ensemble of segmentation models to enable "higher resolution" searches. For instance, FIGS. 16A and 16B illustrate an example image segmentation in accordance with this disclosure. In segmenting the image 1601 of FIG. 16A to produce the segments 1602 in FIG. 16B, without using part segmentation (discussed below in connection with FIGS. 21 and 21A-21B), one could search for "cat" or "cat's tail," but not "tail" alone.

Figure 17:
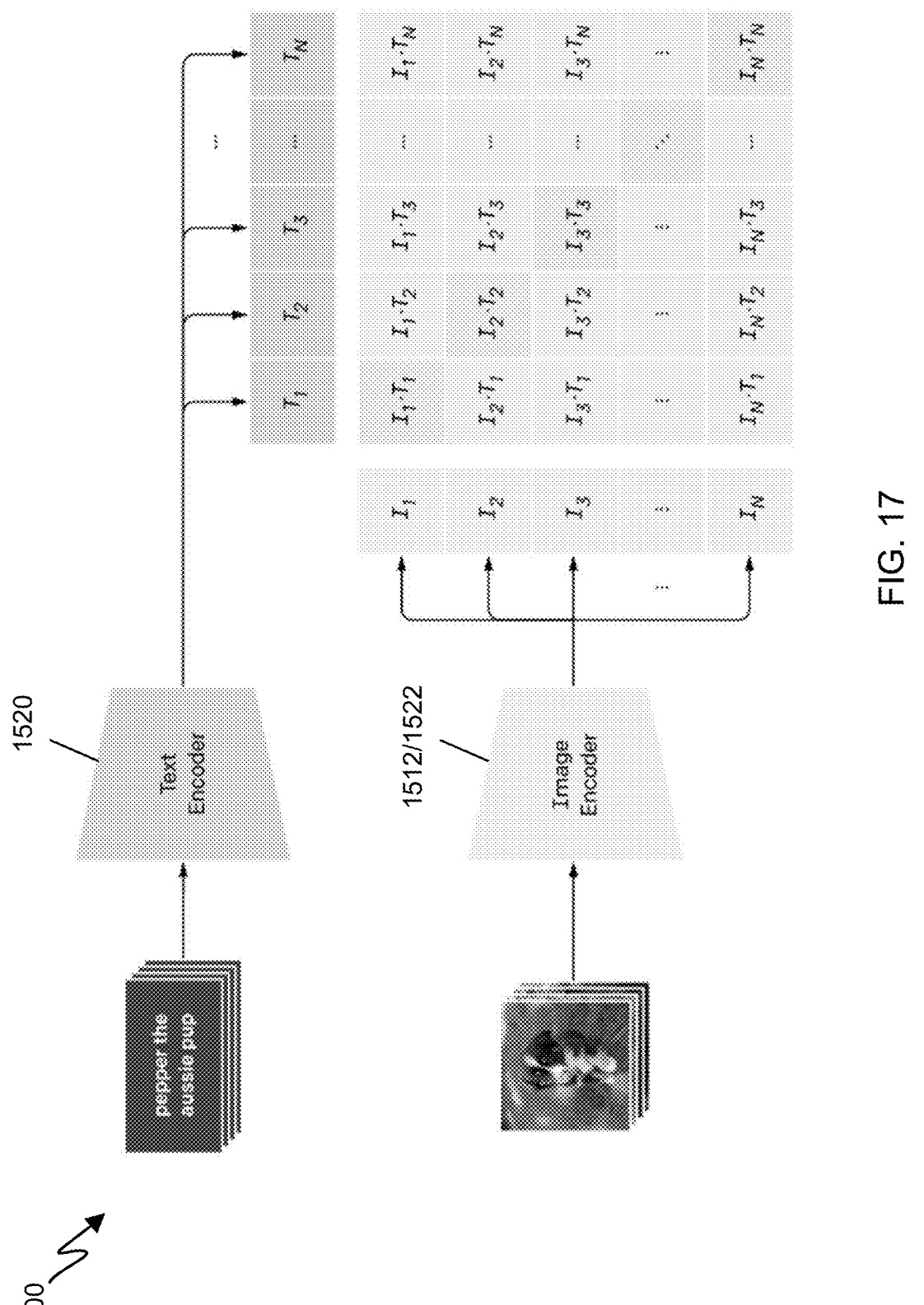
FIG. 17 illustrates an example joint language-visual representation in accordance with this disclosure.

Referring again to FIG. 15, the models used for encoding by image encoder 1512/1522 or language encoder 1520 can be trained in a variety of ways with a variety of data sources. The only constraint is that the model(s) produce a joint language-visual representation. FIG. 17 illustrates an example joint language-visual representation 1700 in accordance with this disclosure. Producing a joint language-visual representation can be accomplished using corpuses of text-image pairs obtained from web crawls. These pairs are then fed through transformer networks and optimized with a contrastive loss function, such as max-margin contrastive loss. As explained in this disclosure, these models allow projection of both text and images into a shared embedding space that makes the text and images directly comparable. The exact choice of model may depend on a variety of factors, such as the exact use case, cost, data availability, data licensing concerns, etc. Various models can be used for this task with minimal fine-tuning required. These models can be trained on an incredibly broad range of visual concepts, capturing data from satellite imagery to social media posts. Alternatively, a model may be specially trained with a focus on capturing visual concepts commonly found in homes and social settings.

Figure 18:
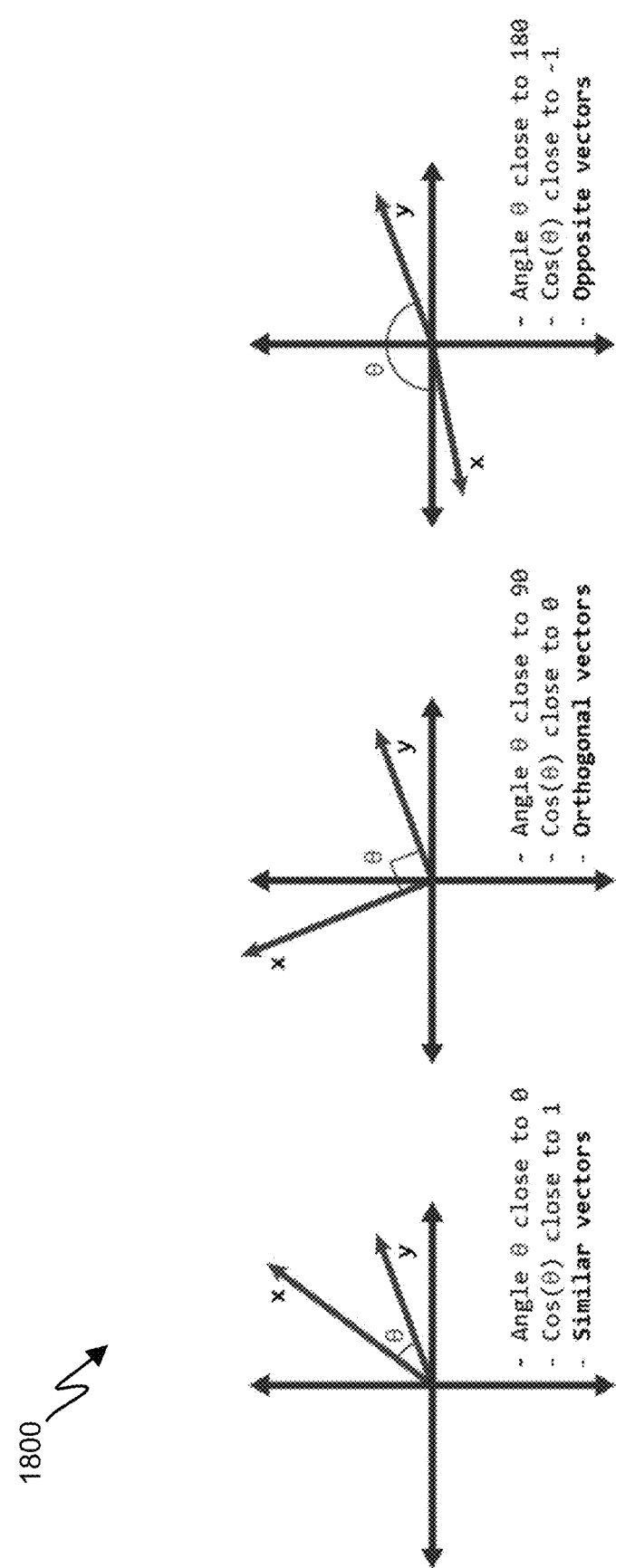
FIG. 18 illustrates an example of using cosine-similarity in accordance with embodiments of this disclosure.

To retrieve embedding vectors from spatial data structure 1518, some notion of similarity is required. In this setting, direct element-wise comparison is practically worthless as any slight change in input (e.g., altering a single pixel) perturbs the encoding ever so slightly, meaning "cat" and "feline" do not map to the exact same value. Instead, one of many similarity metrics that model similarity as some distance metric in Euclidean space may be used. For instance, FIG. 18 illustrates an example 1800 of using cosine-similarity in accordance with embodiments of this disclosure. Using cosine-similarity can produce good results. Simply put, cosine-similarity measures the angle between two normalized embedding vectors, and maps the value between 1 and −1 using the cosine function.

Once a subset of the point cloud is identified, a novel view of the data can be generated using classical 3D modeling and rendering techniques. Given knowledge of the virtual camera's intrinsic matrix, an optimal viewing distance can be found using trigonometric approaches. Finding the correct viewing angle is a bit more complicated, as there are several confounding factors that make the best choice nonobvious. First, at any given viewing angle there is the potential for non-target geometry to occlude a view of the region of interest. Second, there is the possibility that the mesh reconstruction approach was non-optimal, such that a mesh was constructed by various completion and hole filling techniques. These regions may not be presented to the user in some embodiments, as the completed or filled-in regions may not be aesthetically pleasing, or might not capture any real information. Finally, the viewing angle selected should be "natural," matching the angle users are most accustomed to seeing for the object day to day. For example, when viewing a couch, a view that focuses on the underside of the couch should not be selected. Third, because of the sensitive nature of the classifier, a query of the spatial data structure 1518 can return many valid results. To find the most suitable viewing angle, heuristics gleaned from the data capture process may be utilized and, in the absence of such heuristics, the training data. As with 2D sampling, known camera poses that were used to generate the 3D data in the first place may be leveraged.

Although FIG. 15 illustrates one example process 1500 for ingestion, deriving natural language 3D search data, and retrieval, various changes may be made to FIG. 15. For example, various components and functions in FIG. 15 may be combined, further subdivided, replicated, or rearranged according to particular needs. Also, one or more additional components and functions may be included if needed or desired. Additionally, while shown as a series of steps, various steps in FIG. 15 could overlap, occur in parallel, occur in a different order, or occur any number of times (including zero times).

Figure 19:
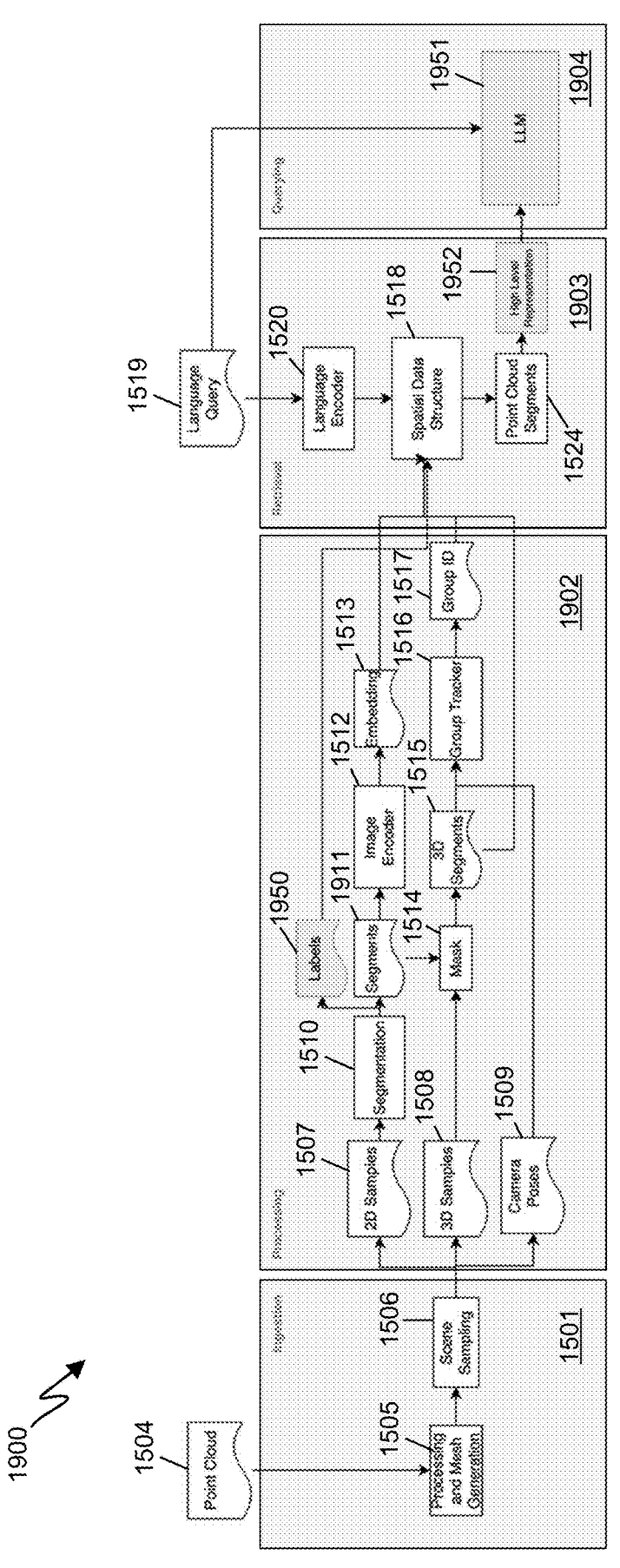
FIG. 19 illustrates an example alternative process of ingestion, deriving natural language 3D search data, and retrieval in accordance with this disclosure.

FIG. 19 illustrates an example alternative process 1900 of ingestion, deriving natural language 3D search data, and retrieval in accordance with this disclosure. For ease of explanation, the process 1900 shown in FIG. 19 is described as being implemented on or supported by the electronic device 101 in the network configuration 100 of FIG. 1. However, the process 1900 shown in FIG. 19 could be used with any other suitable device(s) and in any other suitable system(s), such as when the process 1900 is implemented on or supported by the server 106.

The embodiment shown in FIG. 19 is for illustration only. Other embodiments of the process 1900 could be used without departing from the scope of this disclosure. Building on the functionality described in connection with FIG. 15, a few changes may be introduced to enable technologies like large language models (LLMs) to interface with the 3D data. This will enable intelligent assistants to fulfill requests like "turn on the red lamp next to the couch."

To accomplish this, processing 1902 introduces a segmentation model that also produces a class label 1950 for each segmentation produced. These class labels 1950 could be things like "chair," "table," "lamp," etc. These class labels 1950 are then stored with every entry in the group, allowing LLM 1951 to know exactly what the grouped objects are, which is not apparent from the image embeddings alone.

Figure 20:
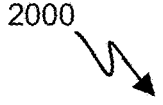
FIG. 20 illustrates an addition process that adds labels to the octree for the chair and lamp discussed in connection with FIGS. 12, 13, and 14, and as an associated query.
Figure 20:

Once the subsets are extracted from the spatial data structure 1518, structures like an oriented bounding box can be computed and the scene represented in a plain text format (high level representation 1952) understandable by the LLM 1951. This high level representation 1952 could be read and understood by the LLM 1951 directly, or code libraries interface with LLM 1951 may be provided. For example, FIG. 20 illustrates addition process 2000 that adds labels to the octree for the chair and lamp discussed in connection with FIGS. 12, 13, and 14, and as an associated query.

Although FIG. 19 illustrates one example alternative process 1900 of ingestion, deriving natural language 3D search data, and retrieval, various changes may be made to FIG. 19. For example, various components and functions in FIG. 19 may be combined, further subdivided, replicated, or rearranged according to particular needs. Also, one or more additional components and functions may be included if needed or desired. Additionally, while shown as a series of steps, various steps in FIG. 19 could overlap, occur in parallel, occur in a different order, or occur any number of times (including zero times).

Figures 21, 21A, 21B:
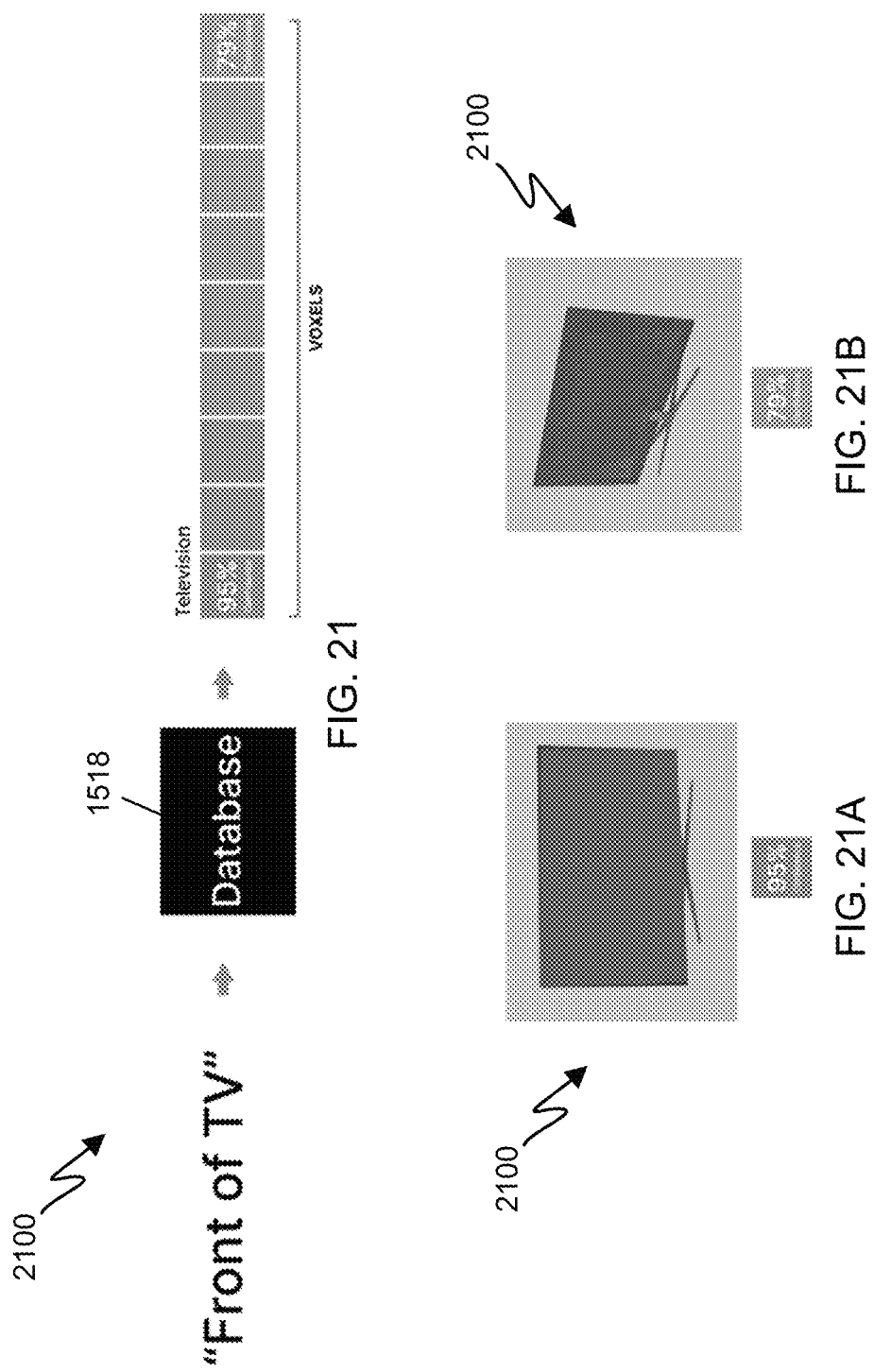
FIGS. 21, 21A, and 21B illustrate a part segmentation process in accordance with this disclosure.

FIGS. 21, 21A, and 21B illustrate a part segmentation process 2100 in accordance with this disclosure. For ease of explanation, the process 2100 shown in FIGS. 21, 21A, and 21B is described as being implemented on or supported by the electronic device 101 in the network configuration 100 of FIG. 1. However, the process 2100 shown in in FIGS. 21, 21A, and 21B could be used with any other suitable device (s) and in any other suitable system(s), such as when the process 2100 is implemented on or supported by the server 106.

The segmentation process 2100 can be performed in addition to the processes of FIGS. 15 and 19. Because each point/voxel is associated with an image embedding, part segmentation can be performed with the technology described above. As shown in FIG. 21, when the points and embeddings for a query ("The front of the TV," in the example shown) are retrieved from spatial data structure 1518, confidence is not uniformly distributed—which is to be expected when considering the specificity of user queries. The front of a television (depicted in FIG. 21A) should not perfectly match an image of the back of the television (depicted in FIG. 21B). In effect, from within every grouping of points/voxels, a gradient of confidences will be extracted. This fact can be leveraged to identify more granular features of the point cloud in one of several ways. First, a simple threshold filter may be applied, eliminating all data that falls below a specified value. That may work in some applications, but is not sensitive enough and may result in many outlier points depending on the data and query. To address this, a more sophisticated approach may involve clustering. Depending on the use case, well established clustering algorithms such as k-means clustering, hierarchical density-based spatial clustering of applications with noise (HDBScan), mean-shift clustering, etc. may be used.

Although FIGS. 21, 21A, and 21B illustrates one example part segmentation process 2100, various changes may be made to FIGS. 21, 21A, and 21B. For example, various components and functions in FIGS. 21, 21A, and 21B may be combined, further subdivided, replicated, or rearranged according to particular needs. Also, one or more additional components and functions may be included if needed or desired. Additionally, while shown as a series of steps, various steps in FIGS. 21, 21A, and 21B could overlap, occur in parallel, occur in a different order, or occur any number of times (including zero times).

Figure 22:
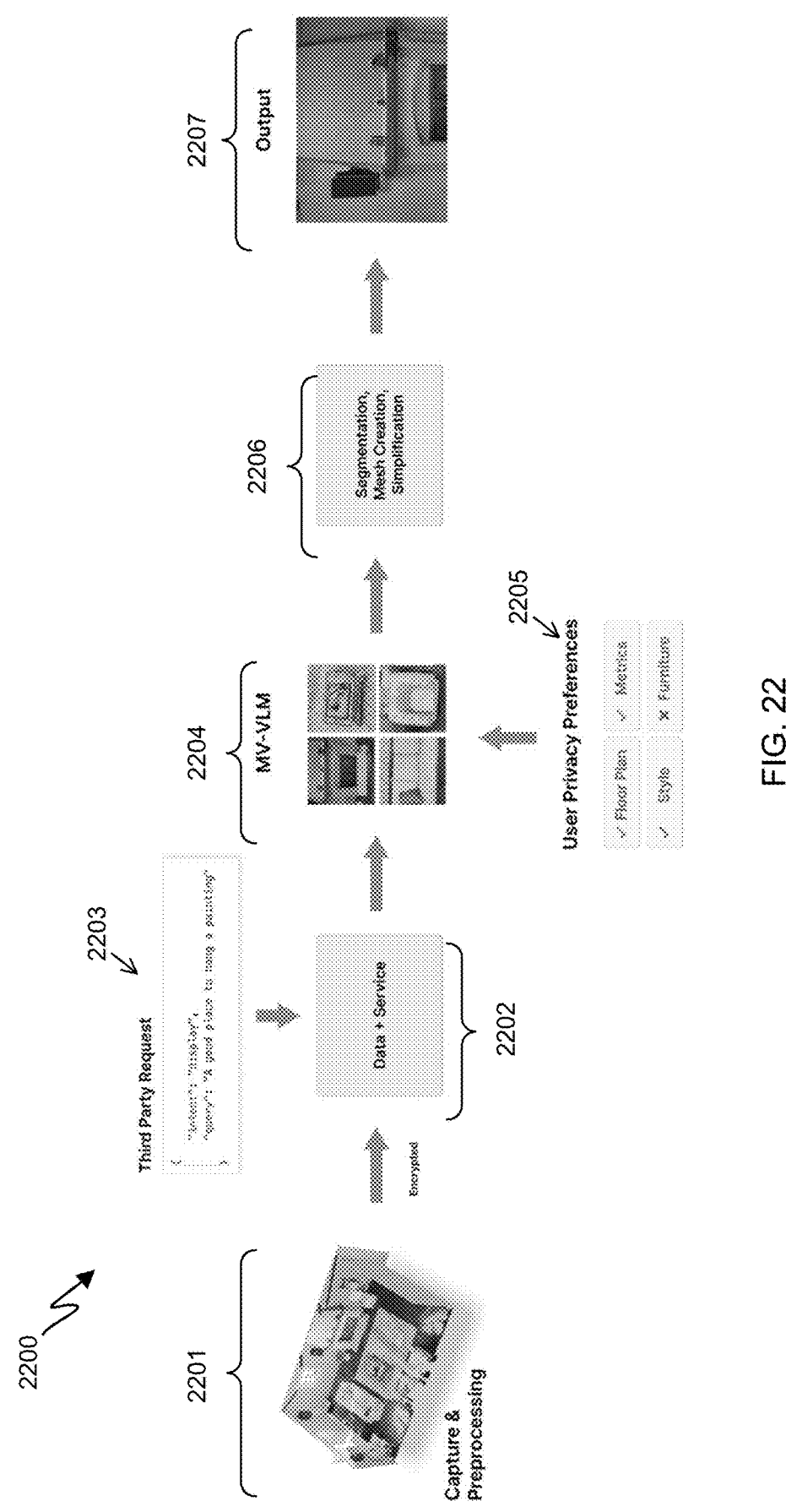
FIG. 22 illustrates a selective filtering process in accordance with this disclosure.

FIG. 22 illustrates a selective filtering process 2200 in accordance with this disclosure. For ease of explanation, the process 2200 shown in FIG. 22 is described as being implemented on or supported by the electronic device 101 in the network configuration 100 of FIG. 1. However, the process 2200 shown in FIG. 22 could be used with any other suitable device(s) and in any other suitable system(s), such as when the process 2200 is implemented on or supported by the server 106.

The process 2200 can be a version of the process of FIG. 15 or FIG. 19 that performs selective filtering of the underlaying data to enable selective sharing of point cloud data with third parties in accordance with pre-specified privacy preferences of a user. The process is analogous to that illustrated by FIG. 11. First the 3D data is captured and pre-processed at step 2201. The encrypted 3D data is provided to a service 2202 that serves third party requests 2203. With the sensitive, natural language classifier architecture contemplated, third parties can request very precise views of a user's data through natural language or constructed language queries. For instance, an e-commerce platform looking to generate a preview of a painting within home could request "a good place to hang a painting" and, once identified, only that subset will be communicated to a visual language model (VLM) 2204. Users can use natural language in user privacy preferences 2205 to ensure that certain types of content are not shared such as "medical devices," "hobbies," etc. With the constrained 3D data, the process then performs segmentation, mesh creation and simplification at step 2206 in the matter described above in connection with either FIG. 15 or FIG. 19, and generates an output 2207 representing, in this example, a determined place to hang a painting.

Although FIG. 22 illustrates one example selective filtering process 2200, various changes may be made to FIG. 22. For example, various components and functions in FIG. 22 may be combined, further subdivided, replicated, or rearranged according to particular needs. Also, one or more additional components and functions may be included if needed or desired. Additionally, while shown as a series of steps, various steps in FIG. 22 could overlap, occur in parallel, occur in a different order, or occur any number of times (including zero times).

Figure 23:
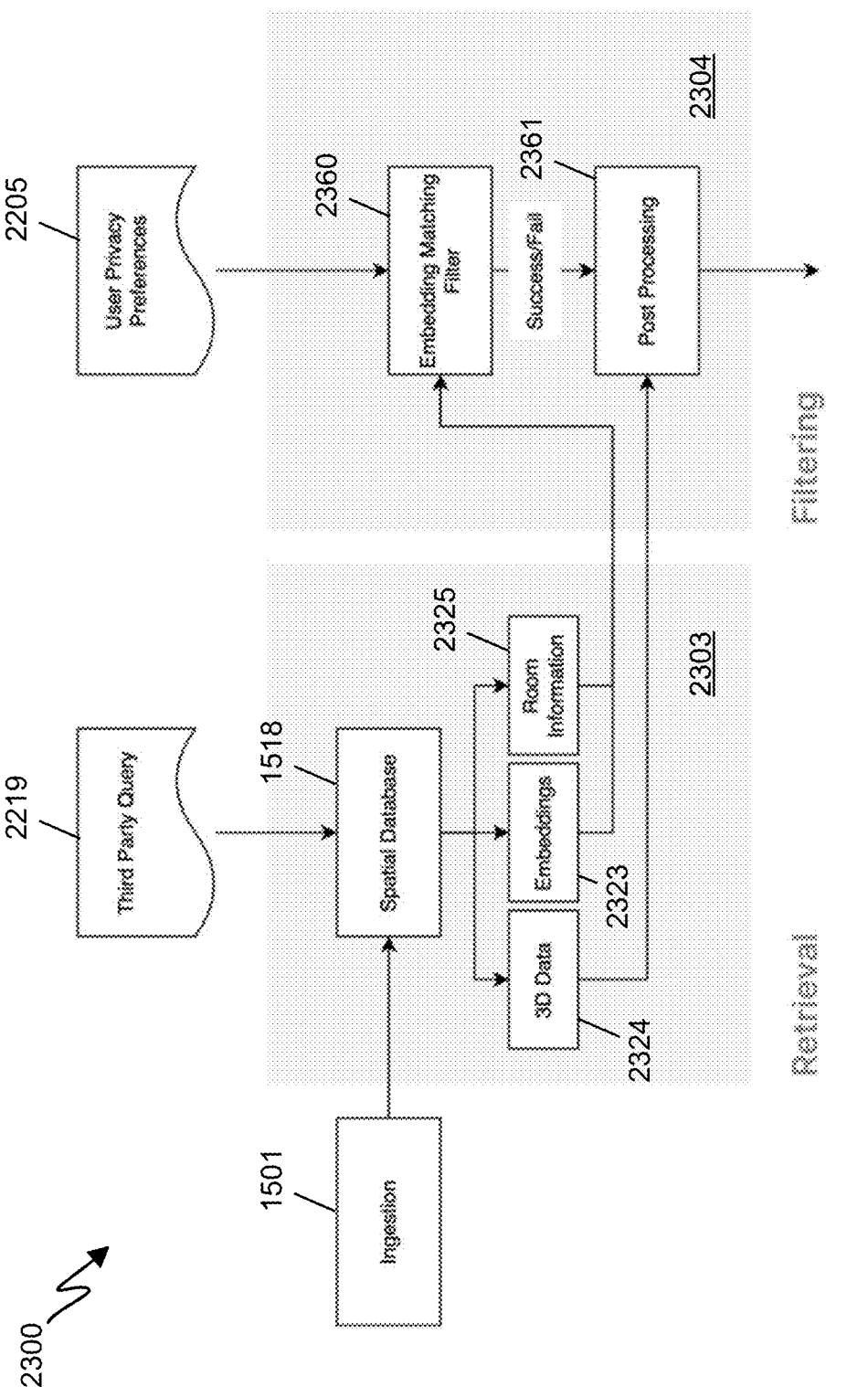
FIG. 23 illustrates a selective filtering process in accordance with this disclosure.

FIG. 23 illustrates a selective filtering process 2300 in accordance with this disclosure. For ease of explanation, the process 2300 shown in FIG. 23 is described as being implemented on or supported by the electronic device 101 in the network configuration 100 of FIG. 1. However, the process 2300 shown in FIG. 23 could be used with any other suitable device(s) and in any other suitable system(s), such as when the process 2300 is implemented on or supported by the server 106.

FIG. 23 is a flow diagram corresponding to the process of FIG. 22. That is, the same ingestion pipeline 1501 and the spatial database 1518 described above are utilized, with the third party query 2219 operating on 3D point cloud data 2324 and embeddings 2323 and, optionally, on room information 2325 such as labels or a high level representation) An additional block 2304 is added to perform filtering during retrieval 2303. This filtering block 2304 comprises the embedding matching filter 2360 and post processing stage(s) 2361. The embedding filter 2360 receives as input the embeddings 2323 retrieved from the spatial database 1518 along with any additional associated metadata. Based on user preferences 2205, the system determines whether the received content is shareable with third parties. Each region of the input 3D data is processed in accordance with the embedding filter 2360, with points rejected by the embedding filter 2360 discarded, but otherwise resulting in a fully segmented model as an output.

Although FIG. 23 illustrates one example selective filtering process 2300, various changes may be made to FIG. 23. For example, various components and functions in FIG. 23 may be combined, further subdivided, replicated, or rearranged according to particular needs. Also, one or more additional components and functions may be included if needed or desired. Additionally, while shown as a series of steps, various steps in FIG. 23 could overlap, occur in parallel, occur in a different order, or occur any number of times (including zero times).

Figure 24:
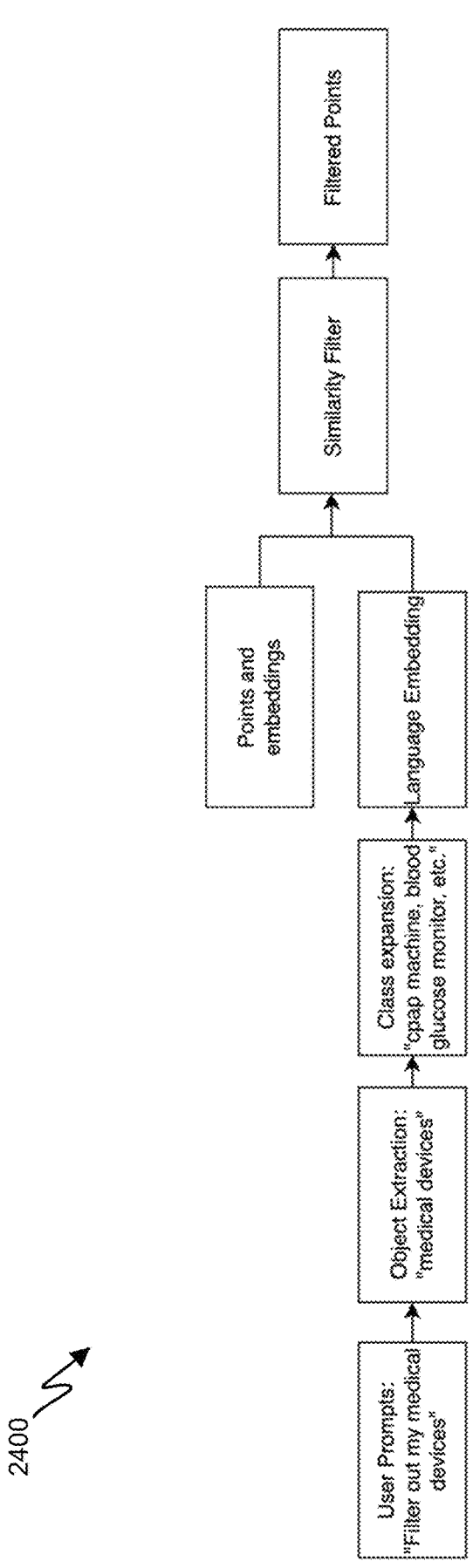
FIG. 24 illustrates a filtering process in accordance with this disclosure.

FIG. 24 illustrates a filtering process 2400 in accordance with this disclosure. For ease of explanation, the process 2400 shown in FIG. 24 is described as being implemented on or supported by the electronic device 101 in the network configuration 100 of FIG. 1. However, the process 2400 shown in FIG. 24 could be used with any other suitable device(s) and in any other suitable system(s), such as when the process 2400 is implemented on or supported by the server 106.

The filtering process 2400 can be used in connection with the processes of FIGS. 22 and 23. To filter points from the point cloud, the innate properties of the embeddings are relied on, to match the embeddings against items in a user defined blacklist. Users can provide natural language prompts such as "medical devices," "children's items," and so on to serve as reference points in the embedding space. To make this filter more robust, another language model may be employed to expand upon the user provided preferences. An input like "medical devices" might resolve to a series of prompts including "blood oximeters," "CPAP machine," "blood glucose monitors," and so forth. Further complicating matters, users might provide extraneous information in prompts, such as instructions or punctuation that can reduce the sensitivity of the model. To address this, classic natural language processing techniques can be used to tag various words as nouns or named entities and extract such words from the user input.

In another example of a use case for the process(es) described above, robotic agents typically have an extremely narrow set of capabilities explicitly designed and planned for by the robot's creators. Discrete actions like picking and placing known objects and navigating space are only accomplished through extensive planning and testing. Outside of these tasks, robots have little ability to plan and have great difficulty in understanding the environment occupied. A robot operating in a kitchen that is asked to make dinner will have to understand the presence of a refrigerator, understand that food is inside the refrigerator, understand how to fetch food, which surfaces to place ingredients on, and so forth. By using the technology described above together with LLM agents, robots can quickly assess what in the environment is relevant to the task at hand, and better plan accordingly. As an example, when a robot in a kitchen is asked to "make me dinner," using this technology described above, the robot will be able to quickly locate relevant items such as appliances, ingredients countertops, etc.

Still another example of a use case for the process(es) described above relates to searching. Users will increasingly capture and interact with 3D data on devices, accruing thousands of 3D scans that will necessitate powerful search functionality. Users have become accustomed to natural language search of 2D imagery, as such functionality is built into devices and is prominently featured in search engines. The search functionality described herein could also be built into many applications or could power new services that warehouse 3D data. For instance, companies that provide robot fleet management software collect huge quantities of 3D-data from robots in operation. This data can be difficult to fully utilize because of the difficulty in finding useful subsets. The technology described herein allows combing through and automatically labeling data quickly.

Users are likely to accrue enormous amounts of 3D data that will be difficult to navigate and search. As such, the technology of the present application is a natural addition to existing applications, such as photo galleries. Long term, 3D data can be anticipated to become commonplace in a number of industries, and end-users will become accustomed to working with 3D data. E-commerce will have deep integrations that better allow users to preview goods online, and social media will regularly feature 3D content. The type of search and segmentation discussed above will be important in powering these future systems. In fact, products such as map applications have already familiarized a large number of people with the basic technology, without also providing the kind of search functionality proposed herein. When virtually touring a home, for example, one must "walk" the virtual camera through the space instead of allowing users to specify what to show using natural language. By combining the subject matter of this disclosure with a digitized building dataset, many industries such as architecture, real estate, interior design, construction, and property management could greatly improve efficiency and scale. That is, with existing applications the users navigate 3D spaces with a point and click interface, and the author of the 3D scan must manually annotate the space to allow users to quickly jump to points of interest. The process(es) of the present disclosure would enable users to navigate with natural language queries using terms such as "desks," "posters," or "mirrors," while greatly decreasing the time and effort required to keep the scan up to date.

Although FIG. 24 illustrates one example filtering process 2400, various changes may be made to FIG. 24. For example, various components and functions in FIG. 24 may be combined, further subdivided, replicated, or rearranged according to particular needs. Also, one or more additional components and functions may be included if needed or desired. Additionally, while shown as a series of steps, various steps in FIG. 24 could overlap, occur in parallel, occur in a different order, or occur any number of times (including zero times).

Figure 25:
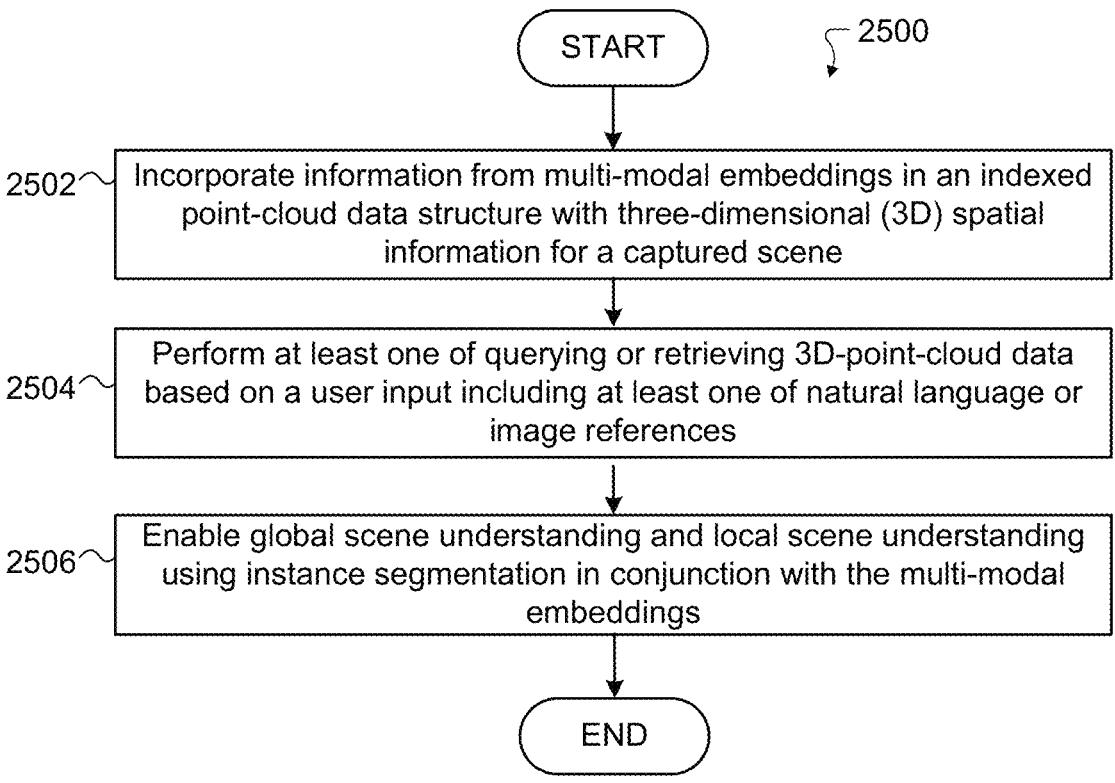
FIG. 25 illustrates an example method for natural language 3D data search in accordance with this disclosure.

FIG. 25 illustrates an example method 2500 for natural language 3D data search in accordance with this disclosure. For ease of explanation, the method 2500 shown in FIG. 25 is described as being implemented on or supported by the electronic device 101 in the network configuration 100 of FIG. 1. However, the method 2500 shown in FIG. 25 could be used with any other suitable device(s) and in any other suitable system(s), such as when the method 2500 is implemented on or supported by the server 106.

For ease of explanation, the method 2500 is described with reference to the process flows depicted in at least FIG. 15 and described above. However, the method 2500 may be employed with any suitable process flow and system and may be readily modified to accommodate variations in the underlying process flow and/or system.

The method 2500 includes incorporating information from multi-modal embeddings in an indexed point-cloud data structure with 3D spatial information for a captured scene at step 2502. At least one of querying or retrieving 3D-point-cloud data based on a user input, which includes at least one of natural language or image references, is performed at step 2504. Global and local scene understanding are enabled using instance segmentation in conjunction with the multi-modal embeddings step 2506.

In any of the foregoing embodiments, the multi-modal embeddings with 3D spatial information may be produced by pre-processing 3D data for the captured scene to generate a 3D point cloud. 2D samples may be extracted by projection from the 3D point cloud, the 2D samples forming a representative summary of the 3D point cloud. 3D samples may be extracted from the 3D point cloud. The 2D samples and the 3D samples may be used to produce a spatial data structure for the captured scene.

In various embodiments, producing the spatial data structure may include segmenting the 2D samples into 2D segments corresponding to objects in the captured scene Each of the 2D segments may be image encoded with a pre-trained encoder, based on 3D points to which the respective 2D segment corresponds, to form a portion of the multi-modal embeddings. The 3D samples may be masked using information relating to the 2D segments to produce 3D segments. Group tracking information and a group identifier for the 3D segments may be determined.

In various embodiments, enabling global scene understanding and local scene understanding using instance segmentation in conjunction with the multi-modal embeddings may include storing the multi-modal embeddings, the 3D points to which any of the 2D segments corresponds, the group tracking information, and the group identifier in the spatial data structure.

In various embodiments, producing the spatial data structure may include receiving camera pose information relating to the 2D samples and the 3D samples. The camera pose information may be employed in determining the group tracking information and the group identifier (ID) for the 3D segments by tracking parts of the 3D point cloud that have been sampled and a corresponding sampling resolution for each sampled part.

In various embodiments, employing the camera pose information may include assigning an embedding vector for an entire segment set to every 3D point contained in the entire segment set. Each frame may be checked for one of the segment sets for 3D points seen in a previously processed, different one of the segment sets. A new group ID may be assigned to 3D points not seen in any previously processed segment set. A previously assigned group ID may be assigned to 3D points seen in at least one previously processed segment set. Embeddings for overlapping images may be averaged.

In various embodiments, enabling global scene understanding and local scene understanding using instance segmentation in conjunction with the multi-modal embeddings may include identifying and extracting subsets of the 3D point cloud using a 2D semantic segmentation model generating one of a discrete set of class labels or masks.

In various embodiments, performing at least one of querying or retrieving 3D-point-cloud data based on user input including at least one of the natural language or the image references may include performing a scan over the multi-modal embeddings in a spatial database based on the user input. Entries in the spatial database that have a similarity score less than a defined threshold may be discarded. From a set of point clouds corresponding to the 2D segments and the 3D segments remaining after discarding entries, a final group of point clouds may be selected based on one or more metrics selected from aggregate confidence, size, or proximity.

Although FIG. 25 illustrates one example of a method 2500 for natural language 3D data search, various changes may be made to FIG. 25. For example, while shown as a series of steps, various steps in FIG. 25 could overlap, occur in parallel, occur in a different order, or occur any number of times (including zero times).

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method, comprising:
   pre-processing three-dimensional (3D) data for a captured scene to generate a 3D point cloud;
   extracting 3D samples from the 3D point cloud;
   extracting, by projection, two-dimensional (2D) samples from the 3D point cloud, the 2D samples forming a representative summary of the 3D point cloud representing objects in the captured scene;
   segmenting the 2D samples into 2D segments corresponding to the objects in the captured scene;
   image encoding, with a pre-trained encoder, each of the 2D segments based on 3D points to which a respective 2D segment corresponds in order to form a portion of multi-modal embeddings for the captured scene;
   masking the 3D samples using information relating to the 2D segments to produce 3D segments;
   incorporating information from the multi-modal embeddings in an indexed point-cloud data structure for the 3D point cloud representing the objects in the captured scene with 3D spatial information for the captured scene;
   performing at least one of querying or retrieving 3D point-cloud data from the indexed point-cloud data structure based on a user input including at least one of natural language or image references; and
   enabling global scene understanding and local scene understanding using instance segmentation in conjunction with the multi-modal embeddings.

2. The method of claim 1, further comprising:
   using the 2D samples and the 3D samples, producing a spatial data structure for the captured scene.

3. The method of claim 2, wherein producing the spatial data structure includes:
   determining group tracking information and a group identifier for the 3D segments.

4. The method of claim 3, wherein enabling global scene understanding and local scene understanding using instance segmentation in conjunction with the multi-modal embeddings includes:
   storing the multi-modal embeddings, the 3D points to which any of the 2D segments corresponds, the group tracking information, and the group identifier in the spatial data structure.

5. The method of claim 3, wherein producing the spatial data structure includes:
   receiving camera pose information relating to the 2D samples and the 3D samples; and
   employing the camera pose information in determining the group tracking information and the group identifier for the 3D segments by tracking parts of the 3D point cloud that have been sampled and a corresponding sampling resolution for each sampled part.

6. The method of claim 5, wherein employing the camera pose information includes:
   assigning an embedding vector for an entire segment set to every 3D point contained in the entire segment set;
   checking each frame for one of the entire segment sets for 3D points seen in a previously processed, different one of the entire segment sets;
   assigning a new group identifier to 3D points not seen in any previously processed segment set;
   assigning a previously assigned group identifier to 3D points seen in at least one previously processed segment set; and
   averaging embeddings for overlapping images.

7. The method of claim 3, wherein enabling global scene understanding and local scene understanding using instance segmentation in conjunction with the multi-modal embeddings includes:
   identifying and extracting subsets of the 3D point cloud using a 2D semantic segmentation model generating one of a discrete set of class labels or masks.

8. The method of claim 3, wherein performing at least one of querying or retrieving 3D-point-cloud data based on user input including at least one of the natural language or the image references includes:
   performing a scan over the multi-modal embeddings in a spatial database based on the user input;
   discarding entries in the spatial database that have a similarity score less than a defined threshold; and
   selecting, from a set of point clouds corresponding to the 2D segments and the 3D segments remaining after discarding entries, a final group of point clouds based on one or more metrics selected from aggregate confidence, size, or proximity.

9. An apparatus comprising:
   at least one processing device configured to:
      pre-process three-dimensional (3D) data for a captured scene to generate a 3D point cloud;
      extract 3D samples from the 3D point cloud;
      extract, by projection, two-dimensional (2D) samples from the 3D point cloud, the 2D samples forming a representative summary of the 3D point cloud representing objects in the captured scene;
      segment 2D samples into 2D segments corresponding to the objects in the captured scene;
      image encode, with a pre-trained encoder, each of the 2D segments based on 3D points to which a respective 2D segment corresponds in order to form a portion of multi-modal embeddings for the captured scene;

mask the 3D samples using information relating to the 2D segments to produce 3D segments;

incorporate information from the multi-modal embeddings in an indexed point-cloud data structure for the 3D point cloud representing the objects in the captured scene with 3D spatial information for the captured scene;

perform at least one of querying or retrieving 3D point-cloud data from the indexed point-cloud data structure based on a user input including at least one of natural language or image references; and enable global scene understanding and local scene understanding using instance segmentation in conjunction with the multi-modal embeddings.

10. The apparatus of claim 9, wherein the at least one processing device is further configured, using the 2D samples and the 3D samples, to produce a spatial data structure for the captured scene.

11. The apparatus of claim 10, wherein, to produce the spatial data structure, the at least one processing device is configured to determine group tracking information and a group identifier for the 3D segments.

12. The apparatus of claim 11, wherein, to enable global scene understanding and local scene understanding using instance segmentation in conjunction with the multi-modal embeddings, the at least one processing device is configured to store the multi-modal embeddings, the 3D points to which any of the 2D segments corresponds, the group tracking information, and the group identifier in the spatial data structure.

13. The apparatus of claim 11, wherein, to produce the spatial data structure, the at least one processing device is configured to:

receive camera pose information relating to the 2D samples and the 3D samples; and employ the camera pose information in determining the group tracking information and the group identifier for the 3D segments by tracking parts of the 3D point cloud that have been sampled and a corresponding sampling resolution for each sampled part.

14. The apparatus of claim 13, wherein, to employ the camera pose information, the at least one processing device is configured to:

assign an embedding vector for an entire segment set to every 3D point contained in the entire segment set;

check each frame for one of the entire segment sets for 3D points seen in a previously processed, different one of the entire segment sets;

assign a new group identifier to 3D points not seen in any previously processed segment set;

assign a previously assigned group identifier to 3D points seen in at least one previously processed segment set; and average embeddings for overlapping images.

15. The apparatus of claim 11, wherein, to enable global scene understanding and local scene understanding using instance segmentation in conjunction with the multi-modal embeddings, the at least one processing device is configured to identify and extract subsets of the 3D point cloud using a 2D semantic segmentation model generating one of a discrete set of class labels or masks.

16. The apparatus of claim 11, wherein, to perform at least one of querying or retrieving 3D-point-cloud data based on user input, the at least one processing device is configured to:

perform a scan over the multi-modal embeddings in a spatial database based on the user input;

discard entries in the spatial database that have a similarity score less than a defined threshold; and select, from a set of point clouds corresponding to the 2D segments and the 3D segments remaining after discarding entries, a final group of point clouds based on one or more metrics selected from aggregate confidence, size, or proximity.

17. A non-transitory computer readable medium containing instructions that when executed cause at least one processor of an electronic device to:

pre-process three-dimensional (3D) data for a captured scene to generate a 3D point cloud;

extract 3D samples from the 3D point cloud;

extract, by projection, two-dimensional (2D) samples from the 3D point cloud, the 2D samples forming a representative summary of the 3D point cloud representing objects in the captured scene;

segment 2D samples into 2D segments corresponding to the objects in the captured scene;

image encode, with a pre-trained encoder, each of the 2D segments based on 3D points to which a respective 2D segment corresponds in order to form a portion of multi-modal embeddings for the captured scene;

mask the 3D samples using information relating to the 2D segments to produce 3D segments;

incorporate information from the multi-modal embeddings in an indexed point-cloud data structure for the 3D point cloud representing the objects in the captured scene with 3D spatial information for the captured scene;

perform at least one of querying or retrieving 3D point-cloud data from the indexed point-cloud data structure based on a user input including at least one of natural language or image references; and enable global scene understanding and local scene understanding using instance segmentation in conjunction with the multi-modal embeddings.

18. The non-transitory computer readable medium of claim 17, further containing instructions that when executed cause the at least one processor to:

produce, using the 2D samples and the 3D samples, a spatial data structure for the captured scene.

19. The non-transitory computer readable medium of claim 18, wherein the instructions that when executed cause the at least one processor to produce the spatial data structure comprise instructions that when executed cause the at least one processor to:

determine group tracking information and a group identifier for the 3D segments.

20. The non-transitory computer readable medium of claim 19, wherein the instructions that when executed cause the at least one processor to enable global scene understanding and local scene understanding using instance segmentation in conjunction with the multi-modal embeddings comprise instructions that when executed cause the at least one processor to:

store the multi-modal embeddings, the 3D points to which any of the 2D segments corresponds, the group tracking information, and the group identifier in the spatial data structure.

* * * * *